US011805505B2

(12) United States Patent
Wang et al.

(10) Patent No.: US 11,805,505 B2
(45) Date of Patent: Oct. 31, 2023

(54) SIDELINK TCI INDICATION FOR SIDELINK MULTI-TRP RELAYING

(71) Applicant: QUALCOMM Incorporated, San Diego, CA (US)

(72) Inventors: Hua Wang, Basking Ridge, NJ (US); Sony Akkarakaran, Poway, CA (US); Mostafa Khoshnevisan, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/227,146

(22) Filed: Apr. 9, 2021

(65) Prior Publication Data

US 2021/0360603 A1  Nov. 18, 2021

Related U.S. Application Data

(60) Provisional application No. 63/024,408, filed on May 13, 2020.

(51) Int. Cl.
*H04W 72/044* (2023.01)
*H04W 16/28* (2009.01)
*H04W 16/26* (2009.01)

(52) U.S. Cl.
CPC ......... *H04W 72/046* (2013.01); *H04W 16/26* (2013.01); *H04W 16/28* (2013.01)

(58) Field of Classification Search
CPC ... H04W 72/046; H04W 16/26; H04W 16/28; H04L 5/0094; H04L 5/0053; H04L 5/0025; H04L 5/0048; H04B 7/0695
See application file for complete search history.

(56) References Cited

U.S. PATENT DOCUMENTS

| 2020/0077369 | A1  |  3/2020 | Zhang et al. |
| 2020/0100277 | A1  |  3/2020 | Khoshnevisan et al. |
| 2020/0336253 | A1* | 10/2020 | He .......................... H04W 4/40 |
| 2022/0217690 | A1* |  7/2022 | Liu ..................... H04W 72/042 |
| 2022/0399927 | A1* | 12/2022 | Tsai ..................... H04B 7/0617 |

FOREIGN PATENT DOCUMENTS

WO   2020029288 A1   2/2020

OTHER PUBLICATIONS

International Search Report and Written Opinion—PCT/US2021/026911—ISA/EPO—dated Jun. 29, 2021.

* cited by examiner

*Primary Examiner* — Eric Myers
(74) *Attorney, Agent, or Firm* — Procopio, Cory, Hargreaves & Savitch LLP

(57) ABSTRACT

Apparatus, methods, and computer-readable media for sidelink multiple transmission reception points (TRPs) relaying are disclosed herein. An example method for wireless communication at a base station includes transmitting communication for a target user equipment (UE) to multiple TRPs for relaying the communication to the target UE over a sidelink. The method may further include configuring, for one or more of the target UE or at least one of the multiple TRPs, a first transmission configuration indicator (TCI) state for a physical sidelink control channel (PSCCH) between the UE and the at least one of the multiple TRPs.

15 Claims, 18 Drawing Sheets

SIDELINK TCI INDICATION FOR SIDELINK MULTI-TRP RELAYING

CROSS REFERENCE TO RELATED APPLICATION(S)

This application claims the benefit of U.S. Provisional Application Ser. No. 63/024,408, entitled "SIDELINK TCI INDICATION FOR SIDELINK MULTI-TRP RELAYING" and filed on May 13, 2020, which is expressly incorporated by reference herein in its entirety.

BACKGROUND

Technical Field

The present disclosure relates generally to communication systems, and more particularly, to wireless communication including sidelink retransmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as D2D communication. There exists a need for further improvements in 5G NR technology, including D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. An example method includes transmitting communication for a target user equipment (UE) to multiple TRPs for relaying the communication to the target UE over a sidelink. The method further includes configuring, for one or more of the target UE or at least one of the multiple TRPs, a first transmission configuration indicator (TCI) state for a physical sidelink control channel (PSCCH) between the UE and the at least one of the multiple TRPs.

In another aspect of the disclosure, a method, a computer-readable medium, and an apparatus are provided for wireless communication at a UE. An example method includes receiving a configuration for a first TCI state for a PSCCH from at least one of multiple TRPs. The method further includes receiving communication from a base station on a sidelink from the multiple TRPs, the communication including the PSCCH from the at least one of the multiple TRPs.

In another aspect of the disclosure, a method, a computer-readable medium, and an apparatus are provided for wireless communication at a TRP. An example method includes receiving, from a base station a configuration for a first TCI state for a PSCCH from at least one of multiple TRPs. The method further includes receiving communication from the base station for a UE. The method further includes transmitting the communication to the UE on a sidelink.

In another aspect of the disclosure, a method, a computer-readable medium, and an apparatus are provided for wireless communication at a TRP. An example method includes receiving communication from the base station for a UE. The method further includes transmitting the communication to the UE on a sidelink. The method further includes indicating a PSCCH TCI state for at least one of multiple TRPs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
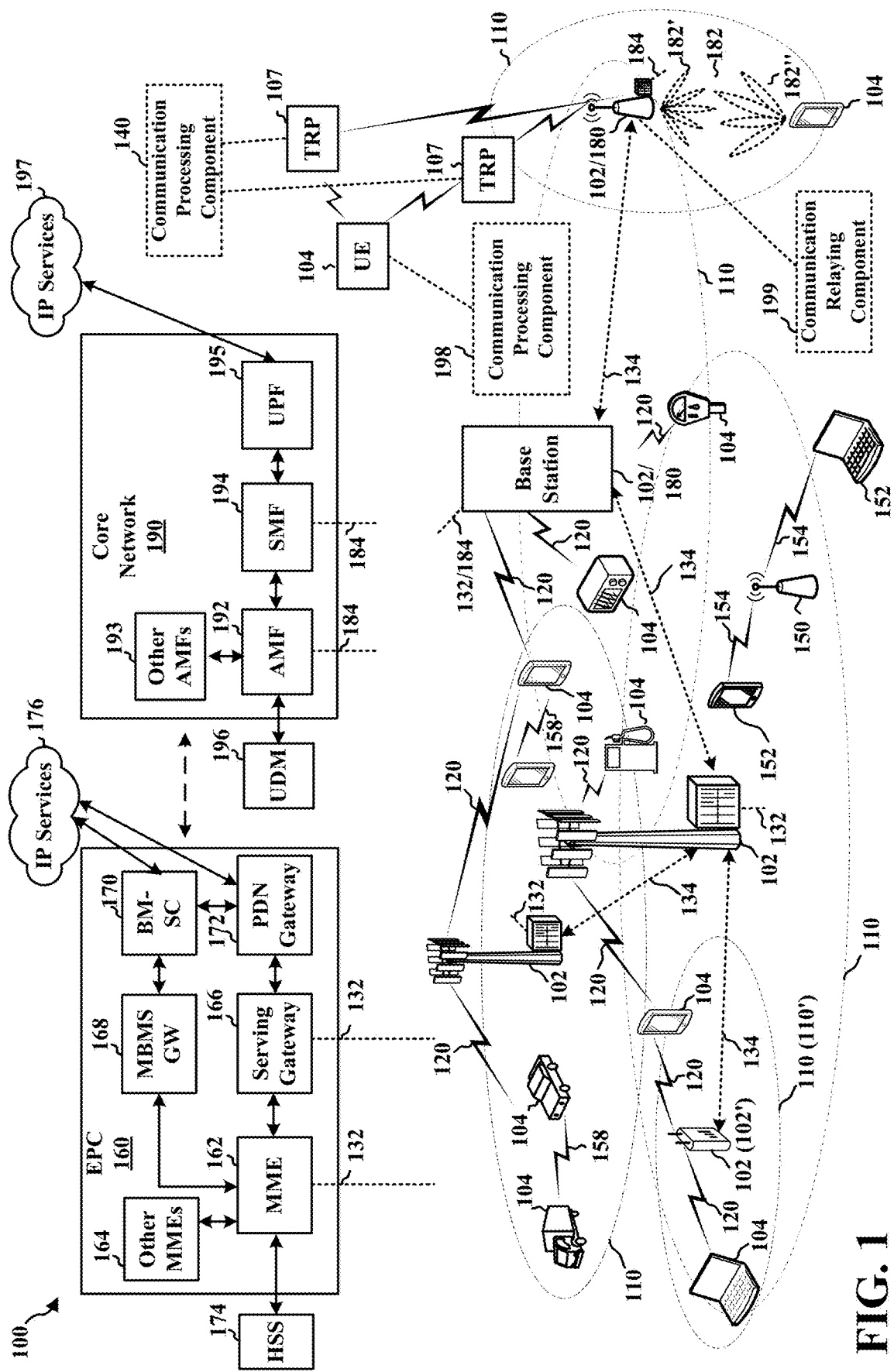
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

A base station may coordinate multiple transmission reception points (TRPs) to relay communication over sidelink to one or more UEs. For example, when packets containing information are transmitted from the base station to a first UE, the base station's link to the first UE may be of poor quality or blocked. As such, the base station may utilize other UEs, e.g., UE2 and UE3, to perform multi-TRP sidelink transmissions to relay the packets to the first UE. Aspects presented herein provide sidelink TCI state indications for supporting such multi-TRP relaying over sidelink. The TCI state indications may include indications to the target UE and/or the relay UEs. The TCI state indications may enable one or more of the relay UEs to indicate TCI state information to the target UE. The TCI state indications may be provided for a control channel, e.g., a physical sidelink control channel (PSCCH), a physical sidelink shared channel (PSSCH), and/or a physical sidelink feedback channel (PSFCH).

In certain aspects, the UE 104 may include a communication processing component 199. The communication processing component 199 may be configured to receive, from a base station a configuration for a first TCI state for a PSCCH from at least one of multiple TRPs 107 and to receive communication from the base station 102/180 on a sidelink from the multiple TRPs 107. One or more of the multiple TRPs 107 may be a UE 104, in some examples. The TRPs 107 may include a communication processing component 140 that receives communication from a base station 102/180 for the UE 104 and may transmit the communication to the UE 104 on a sidelink. The communication processing component 140 may also be configured to receive a first TCI state from the base station 102/180 for a PSCCH from at least one of multiple TRPs 107 and to use the TCI state to transmit to the UE 104 over sidelink.

In some aspects, the base station 102/180 may include a communication relaying component 198. The communication relaying component 198 may be configured to transmit communication for a target UE 104 to multiple TRPs 107 for relaying the communication to the target UE 104 over a sidelink. One or more of the multiple TRPs 107 may be a UE 104. The communication relaying component 198 may configure, for one or more of the target UE 104 or at least one of the multiple TRPs 107, a first TCI state for a PSCCH.

FIG. 1 is a diagram illustrating an example of a wireless communications system and an access network 100. Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a TRP, or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description provides examples directed to sidelink communications in 5G, the concepts described herein may be applicable to uplink communications and/or downlink communications and/or in environments in which sidelink communications may be beneficial. Aspects of the communication may be based sidelink communication e.g., as described in connection with the example in FIG. 2. Furthermore, while the following description provides examples directed to 5G NR, the concepts described herein may be applicable to other similar areas, such as LTE, LTE-A, CDMA, GSM, and/or other wireless technologies.

Figure 2:
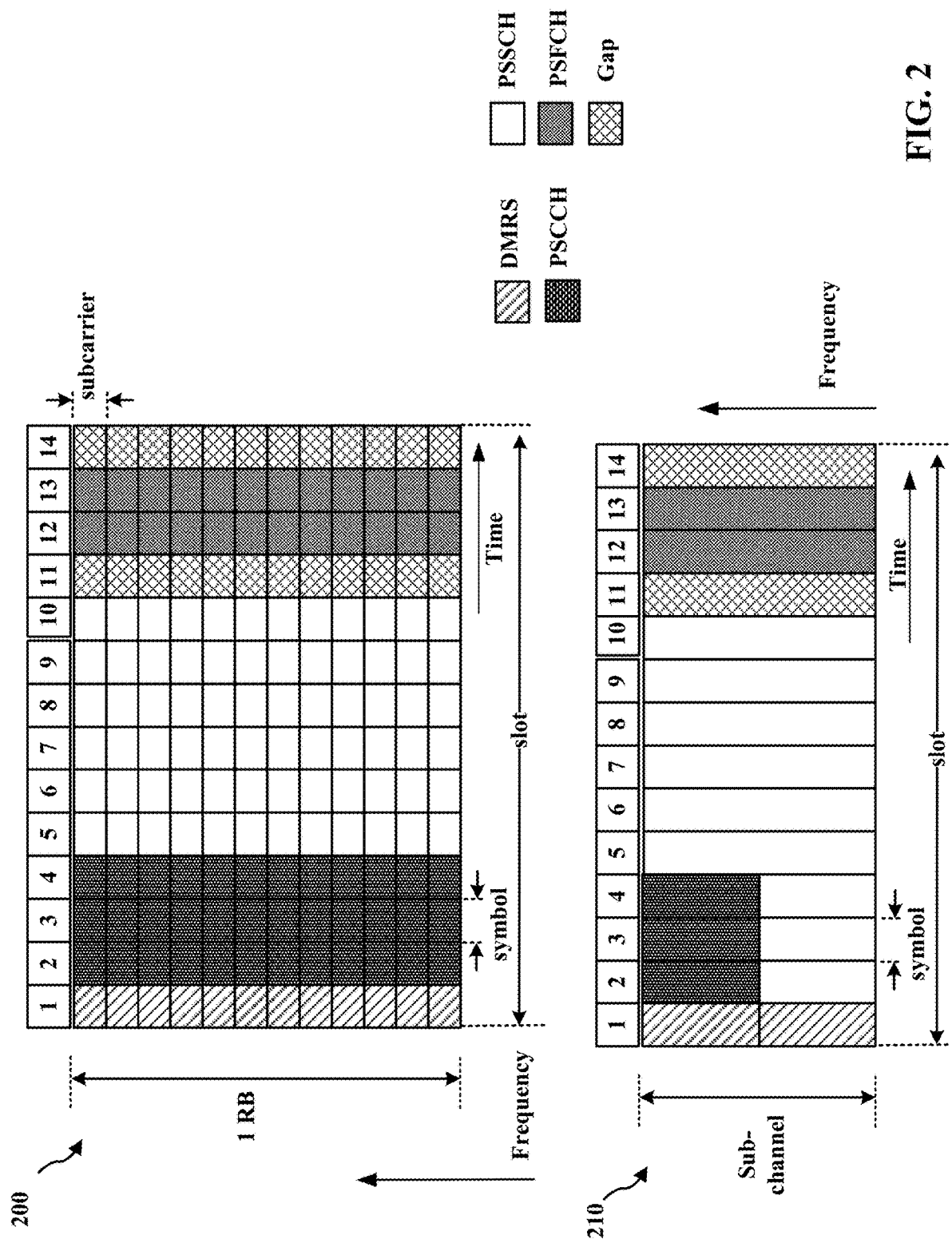
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
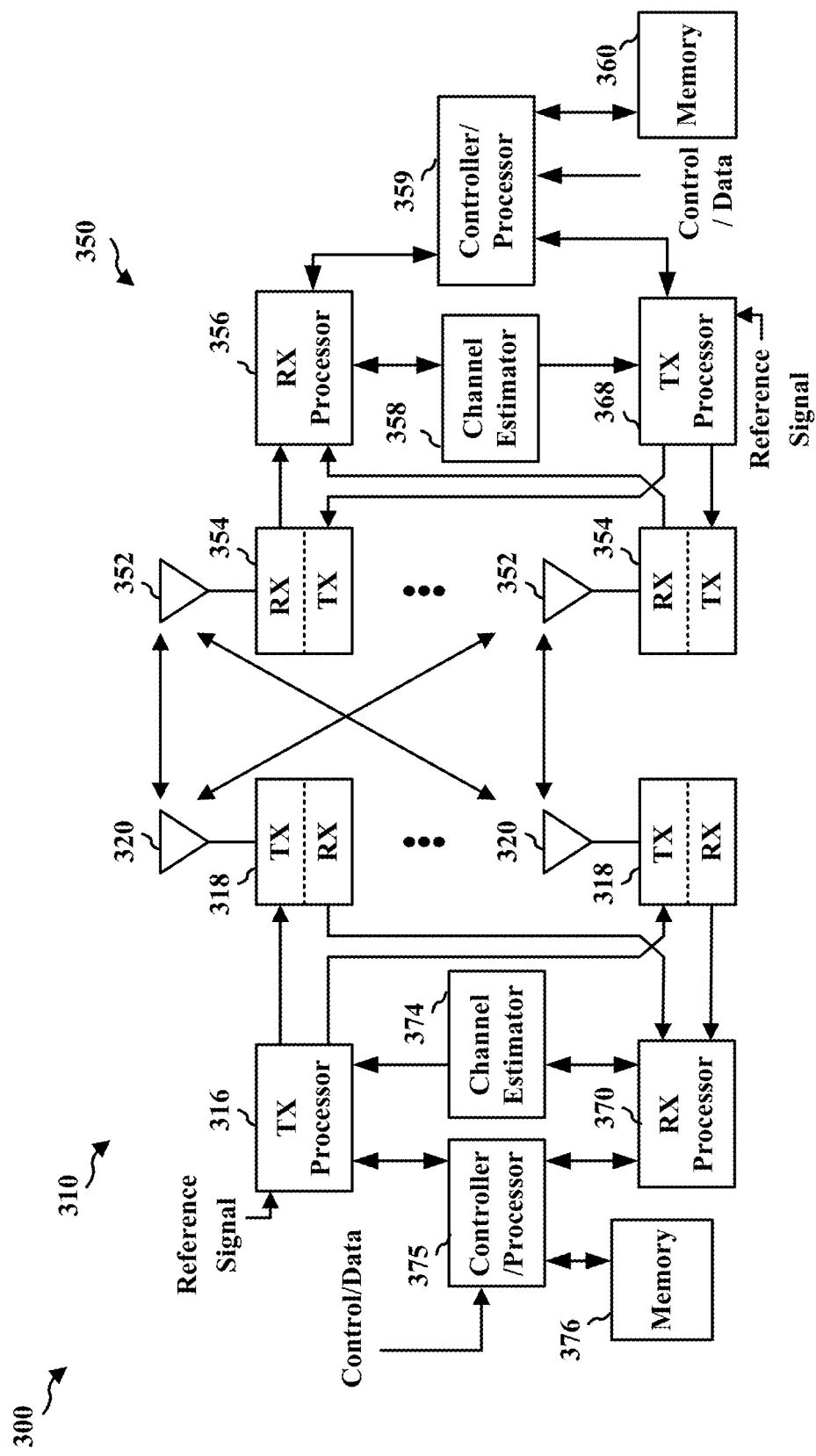
FIG. 3 is a diagram illustrating an example of a base station and UE in an access network.

FIG. 3 is a block diagram 300 of a first wireless communication device 310 in communication with a second wireless communication device 350. In some examples, the devices 310 and 350 may communicate based on V2X or other D2D communication. The communication may be based, e.g., on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with the communication processing component 199 of FIG. 1.

At least one of the TX processor 316, the RX processor 370, and the controller/processor 375 may be configured to perform aspects in connection with the communication relaying component 198 of FIG. 1.

Figure 4:
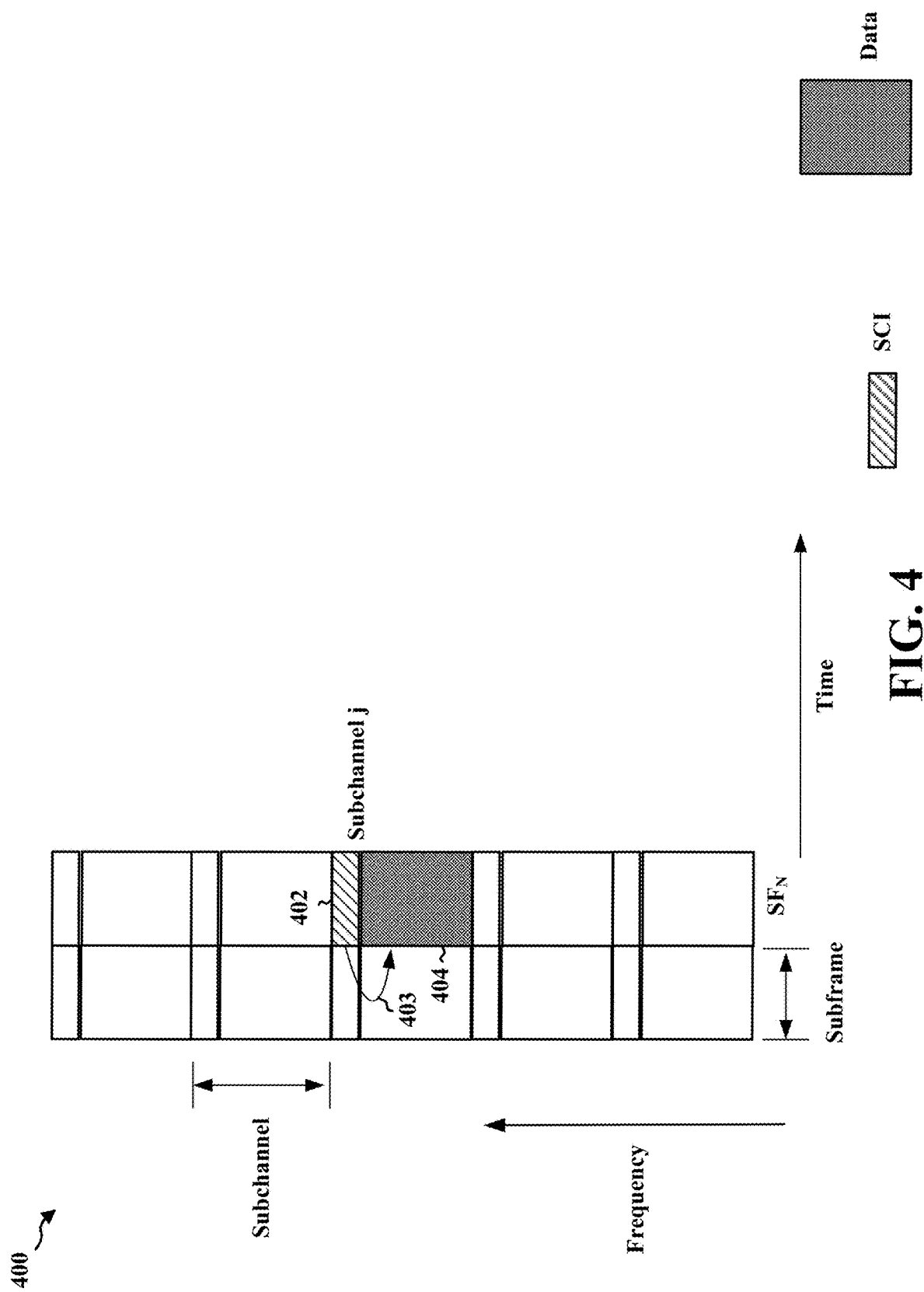
FIG. 4 illustrates an example of a sidelink transmission.

FIG. 4 illustrates an example diagram 400 of sidelink communication. Although FIG. 4 illustrates the concept using subframes, the aspects may be similarly applied to communication based on slots or other timing information.

FIG. 4 illustrates an example transmission including sidelink control information (SCI) 402 and data 404. The SCI 402 may indicate the resources for the data 404 and may be transmitted before the data. The SCI may indicate resources for additional data transmissions. The example in FIG. 4 illustrates the SCI 402 and the data 404 in adjacent frequency resources. This is merely one example to illustrate the concept of a transmission including data and SCI. The SCI 402 and the data 404 may alternatively be transmitted in non-adjacent frequency resources and/or in different time resources in other examples. The SCI 402 may be transmitted in a PSCCH, and the data 404 may be transmitted in a PSSCH. As illustrated by the arrow 403, the SCI 402 includes information about the data transmission 404 that enables receiving devices to receive the data 404, e.g., MCS information, information about the frequency and/or time resources used to transmit the data, whether the data is an initial transmission or a retransmission, etc. In some examples, the transmission (e.g., data 404) may be an initial transmission. In some examples, the transmission (e.g., data 404) may be a retransmission of a previous, initial transmission. In examples in which the transmission is a retransmission, the SCI 402 may indicate resources for the retransmission.

In some examples, the transmission may be based on periodic resources such as SPS, and the transmission may indicate the following transmission period before the next transmission (e.g., 20 subframes, 50 subframes, 100 subframes, 200 subframes, 1000 subframes, etc.).

The SCI 402 may carry information about the time and/or frequency of the resources for a subsequent transmission. As illustrated, the SCI 402 may carry information about a time gap (e.g., subframe gap) between the two transmissions, information about frequency resources for the second transmission (e.g., a starting subchannel).

SCI may include two stages, SCI-1 and SCI-2. SCI-1 may be transmitted on PSCCH and may include information for resource allocation and decoding SCI-2. SCI-2 may be transmitted on PSSCH and may include information for decoding data. SCI-1 may be decodable by all UEs whereas some UEs may not be capable of decoding SCI-2. An example SCI-1 may include any of priority information (e.g., a quality of service QoS value), a PSSCH resource assignment (such as frequency and time resource assignment for PSSCH), a resource reservation period, a PSSCH DMRS pattern, a format information of SCI-2 (such as size information), an offset for SCI-2 control resource allocation, an indication of a number of PSSCH DMRS ports, a modulation and coding scheme (MCS), or the like. SCI-2 may include a HARQ process ID, a new data indicator (NDI), a source ID, a destination ID, a CSI report trigger, a Zone ID of transmitter and/or a communication range.

A transmitter of the transmission, such as a UE or a base station, may select a DMRS pattern and signal the pattern in the SCI-1 according to the channel conditions. The SCI-2 may be mapped to contiguous RBs in a PSCCH starting from the first symbol with PSSCH DMRS. The SCI-2 may be scrambled separately from sidelink shared channel (SL-SCH). The SCI-2 may be decoded using non-blind decoding as the SCI-2 format is indicated in SCI-1 and the starting location of SCI-2 may be known. The SCI-2 transmission may be copied on two layers if the SL-SCH transmission is on two layers.

Figure 5:
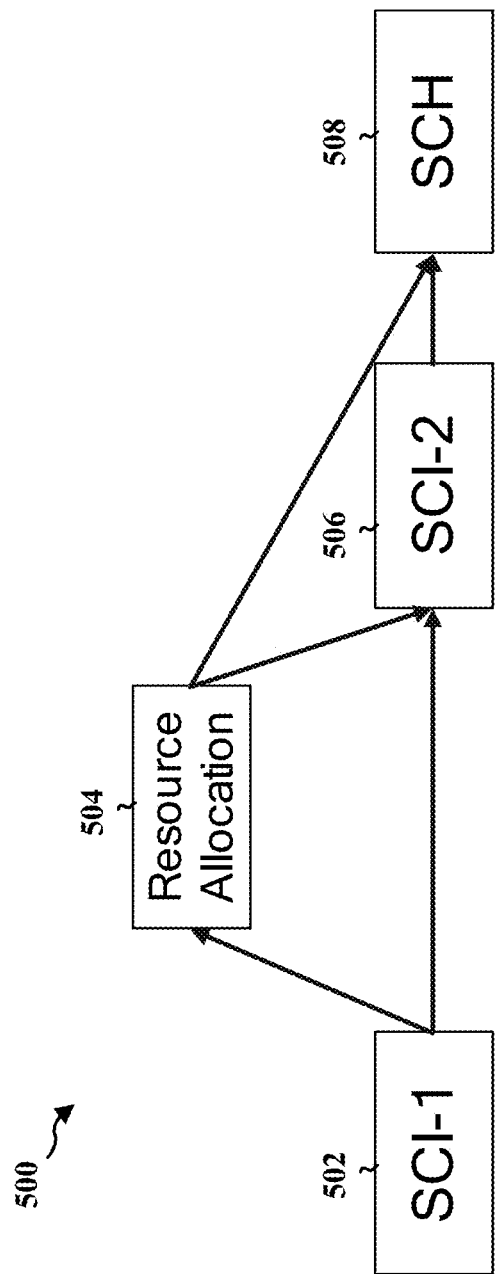
FIG. 5 illustrates example aspects of different portions of sidelink control information (SCI).

FIG. 5 illustrates an example diagram 500 showing that SCI-1 502 may carry resource allocation information 504 for SCI-2 506 and the data 508 (e.g., PSSCH). The SCI-2 506 may carry additional information for receiving the data 508.

As illustrated by the arrow 403 in FIG. 4, the SCI 402 may include information about the data transmission 404 that enables receiving devices to receive the data 404, e.g., MCS information, information about the frequency and/or time resources used to transmit the data, whether the data is an initial transmission or a retransmission, etc. In some examples, the transmission (e.g., data 404) may be an initial transmission. In some examples, the transmission (e.g., data 404) may be a retransmission of a previous, initial transmission. In examples in which the transmission is a retransmission, the SCI 402 may indicate resources for the retransmission.

In some examples, the transmission may be based on SPS, and the transmission may indicate the following transmission period before the next transmission (e.g., 20 subframes, 50 subframes, 100 subframes, 200 subframes, 1000 subframes, etc.).

The SCI 402 may carry information about the time and/or frequency of the resources for a subsequent transmission. As illustrated, the SCI 402 may carry information about a time gap (e.g., subframe gap) between the two transmissions, information about frequency resources for the second transmission (e.g., a starting subchannel).

Figure 6:
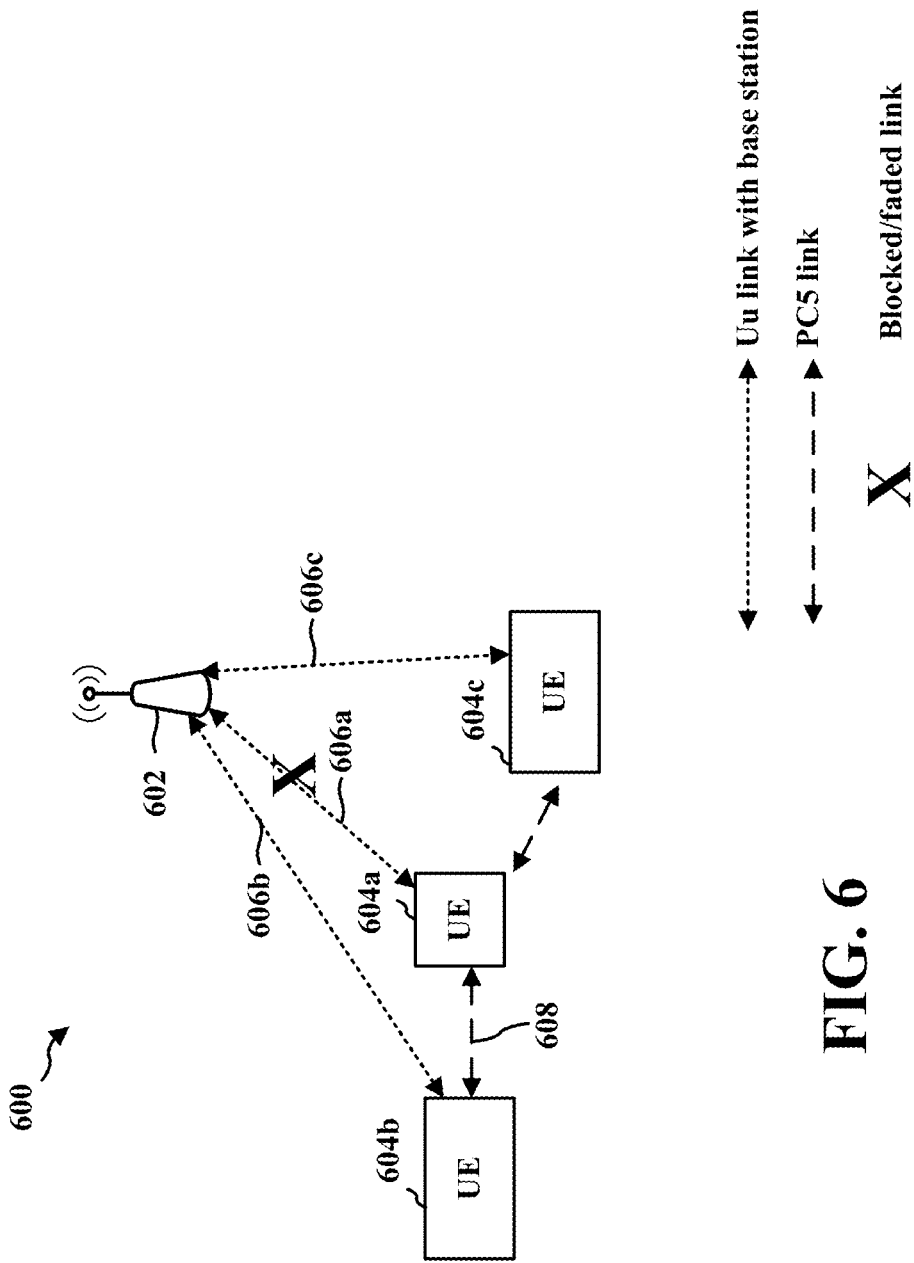
FIG. 6 illustrates example aspects of a wireless communication system including a base station and UEs.

FIG. 6 illustrates an example of wireless communication systems 600, in accordance with aspects of the present disclosure. The wireless communication system 600 includes a base station 602 and UEs 604a, 604, and 604c. In the illustrated example, the base station 602 may establish respective communication links 606a, 606b, 606c with the UEs 604a, 604b, 604c.

Due to an issue, such as blockage or fading, the communication link 606a between the base station 602 and the first (or target) UE 604a may be degraded, fail, or be dropped. Accordingly, the base station 602 may leverage sidelink channels (e.g., a sidelink channel 608) to communicate with the target UE 604a. In the illustrated example of FIG. 6, the base station 602 may determine that the second UE 604b (or other TRP) is in, or near, a helping group of devices that are able to facilitate communication between the base station 602 and the target UE 604a. Accordingly, in FIG. 6, the second UE 604b may help or assist the target UE 604a by forwarding or retransmitting data received from the base station 602 to the target UE 604a through the sidelink 608. The devices illustrated as UEs 604b and 604c may also be other TRPs that relay communication from the base station 602 to the UE 604a, in some examples.

In some examples, to facilitate communication between the base station 602 and the target UE 604a, the base station 602 may transmit communication to one or more UEs 604b and 604c near the target UE 604a for relaying the communication to the target UE 604a over a sidelink. The base station 602 may configure a TCI state for a PSCCH in the communication. In some aspects, the base station may further indicate for UEs 604b and 604c to transmit on one or more beams and may receive reports from the UEs. The UEs 604b and 604c may transmit reports for the one or more beams. The base station 602 may configure the sidelink TCI state based on the report. In some aspects, the base station 602 may configure the target UE 604a to receive TCI state from another UE, such as UE 604b or UE 604c. In some aspects, the UEs 604b and 604c may determine beams to use. In some examples, a Mode 1, sidelink resource allocation may be used for the sidelink communication between the UEs 604b and 604c and the target UE 604a.

Figure 7:
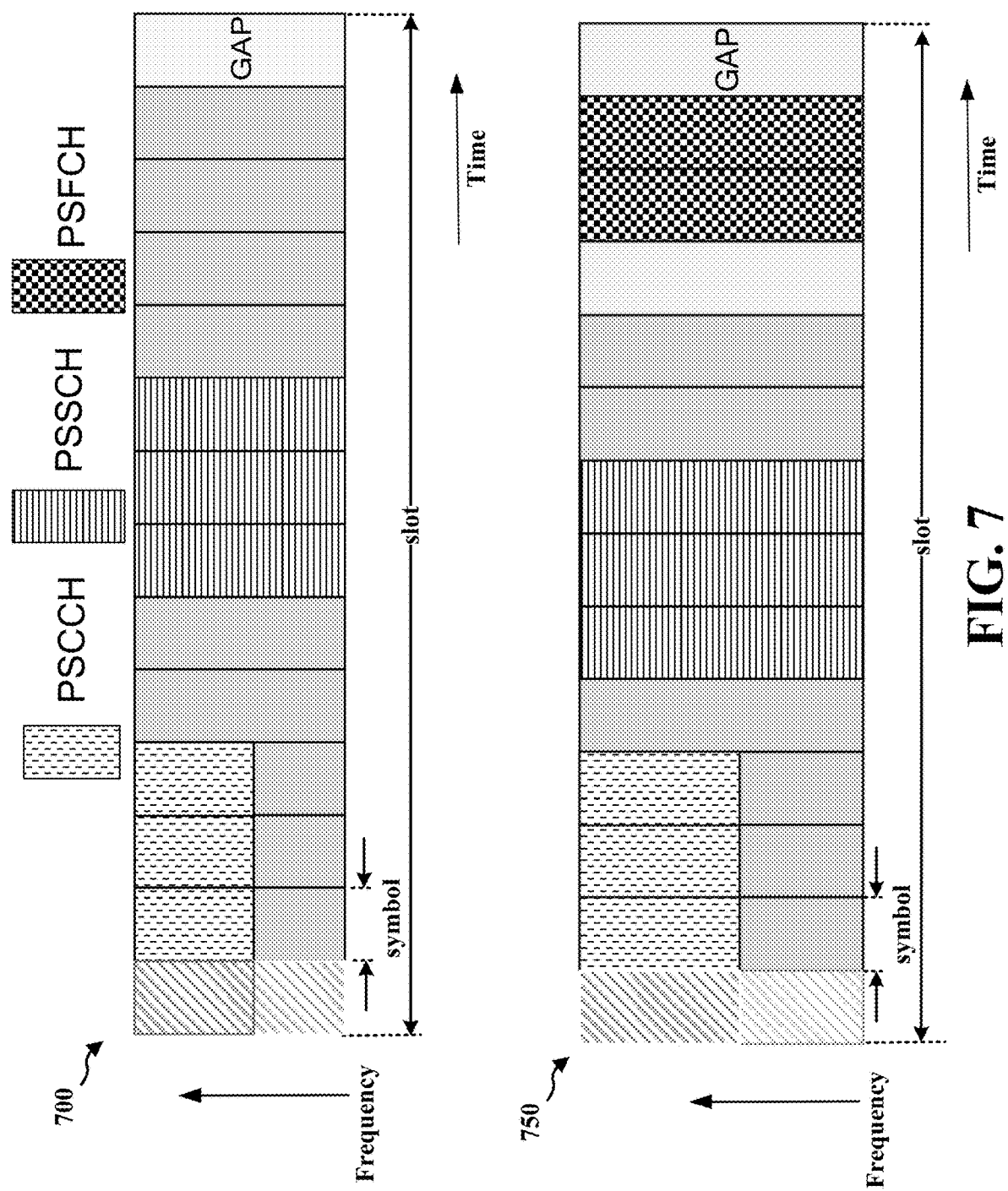
FIG. 7 illustrates examples of sidelink communication structure.

As described in connection with FIG. 2, a slot may comprise 14 OFDM symbols. Sidelink can be configured to occupy fewer than 14 symbols in a slot. The first symbol of the slot may be repeated on a preceding symbol for an automatic gain control (AGC) settling. As illustrated in examples 700 and 750 of FIG. 7, a gap symbol may be present after the PSSCH. A Sub-channel size may be configured to {10, 15, 20, 25, 50, 75, 100} PRBs. The PSCCH and the PSSCH may be transmitted in the same slot. HARQ feedback may be configured for transmission on a PSFCH. A PSFCH resource period may be {0, 1, 2, 4} slots. An OFDM symbol may be dedicated to the PSFCH in some examples. The first PSFCH symbol may be a repetition of the second PSFCH symbol, e.g., for AGC settling. A gap symbol may be placed before and/or after the PSFCH symbols.

Figure 8:
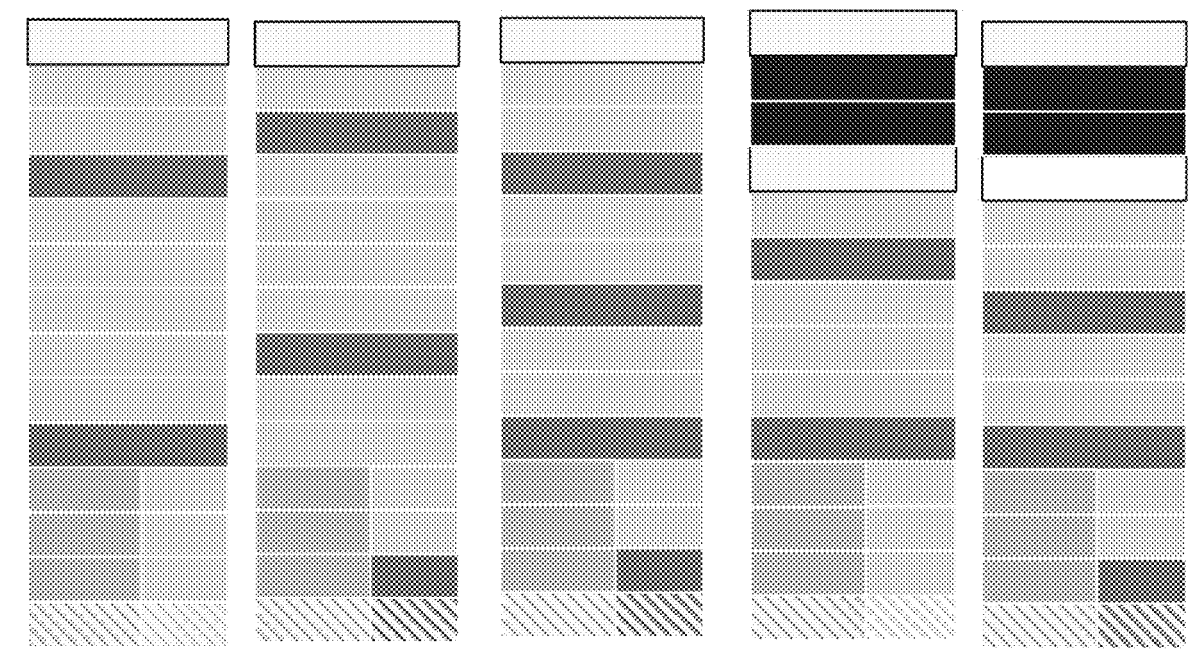
FIG. 8 illustrates examples of sidelink communication structure.
Figure 8:
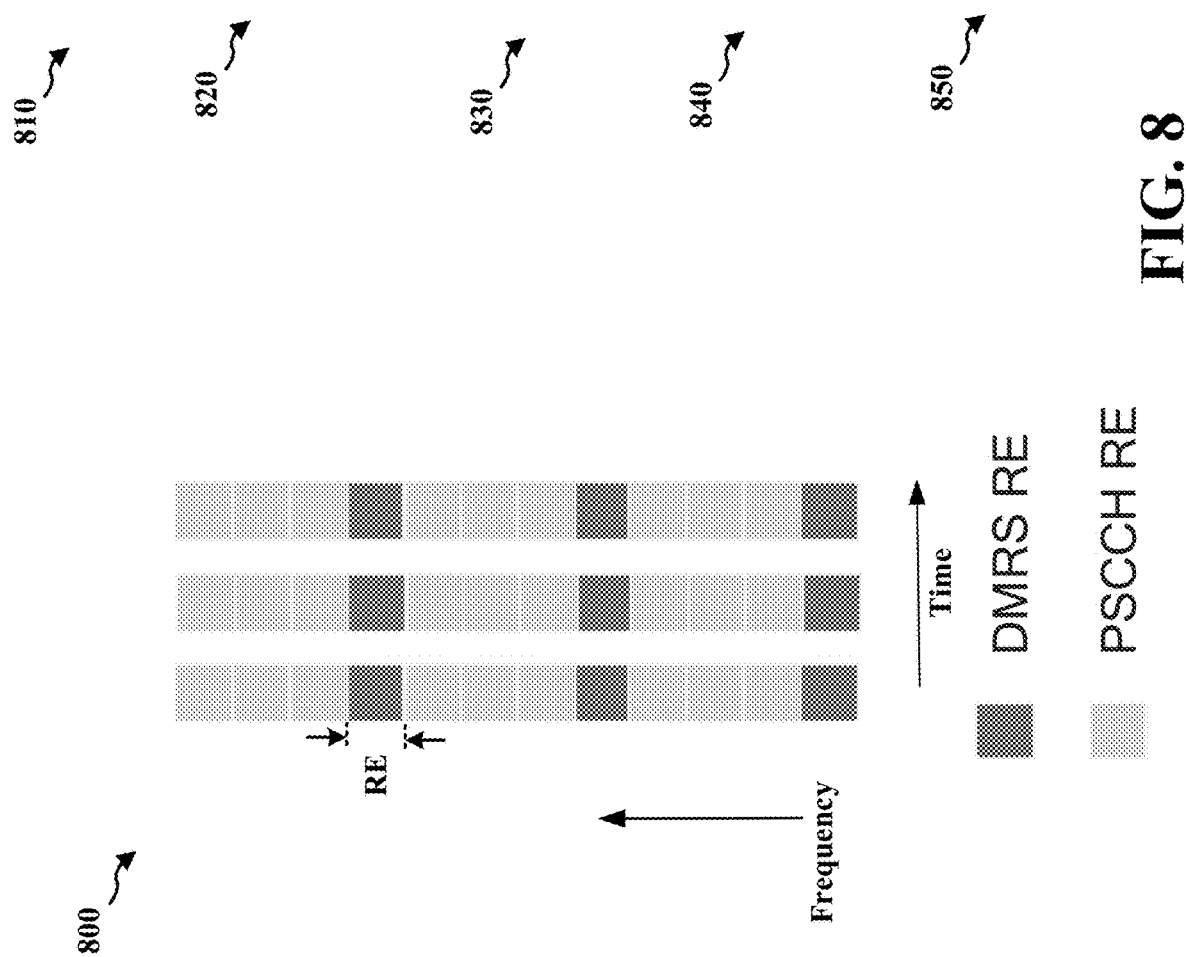

A PSCCH duration may be configured to be 2 or 3 symbols. The PSCCH may be configured to span {10, 12, 15, 20, 25} PRBs, and may be limited to a single subchannel. DMRS may be present in each PSCCH symbol and may be placed on a pattern of REs, such as every $4^{th}$ RE. FIG. 8 illustrates an example DMRS pattern 800 in PSSCH REs. A frequency domain orthogonal cover code (FD-OCC) may be applied to the DMRS to the impact of colliding PSCCH transmissions. A transmitter UE may randomly select from a set of pre-defined FD-OCCs to apply to the DMRS. A starting symbol for the PSCCH may be the second symbol in the slot, e.g., after a first symbol which is used for AGC.

One and two layer transmissions may be supported with QPSK, 16-QAM, 64-QAM, and 256-QAM. Other DMRS patterns, such as 2, 3, and 4 symbol DMRS patterns can be configured for use by the transmitter, such as illustrated in the examples 810, 820, 830, 840, and 850 of FIG. 8. The transmitter may select a DMRS pattern, and may signal it in SCI-1, according to channel conditions. DMRS patterns for 12 and 9 symbol PSSCH and patterns for other lengths may be defined.

Figure 9:
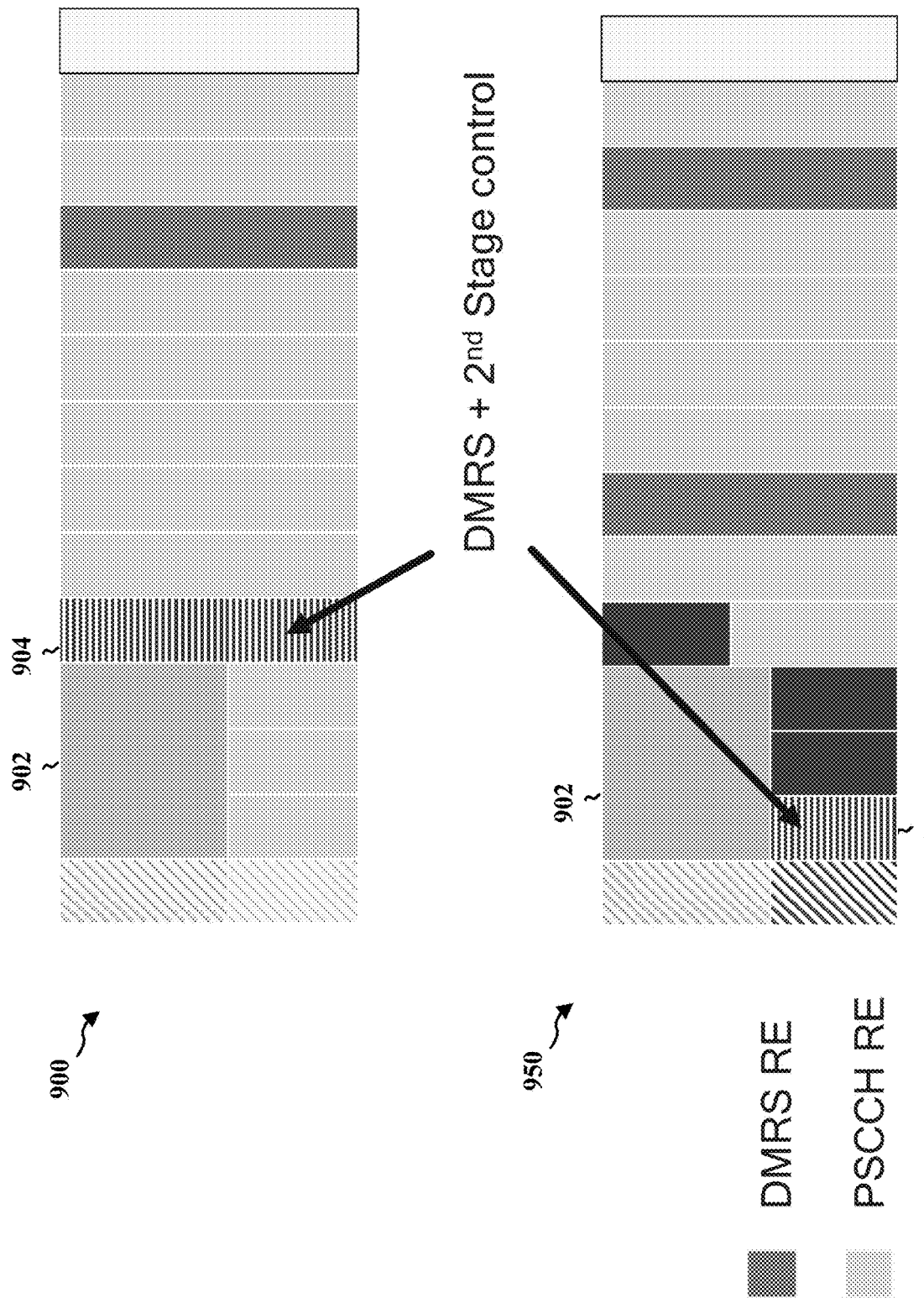
FIG. 9 illustrates examples of sidelink communication structure.

FIG. 9 illustrates examples 900 and 950 showing SCI-2 locations. FIG. 9 illustrates that the SCI-2 904, e.g., the second stage control, may be mapped to contiguous RBs in the PSSCH, e.g., starting from a first symbol with PSSCH DMRS. The SCI-2 may be scrambled separately from the PSSCH. The SCI-2 may be based on QPSK. In some examples, the UE may not perform blind decoding. In such an example, the SCI-2 format may be indicated in the SCI-1 902. The number of REs may be derived from the SCI-1 content, and the SCI-2 may be based on a known starting location. When the PSSCH transmission is on two layers, the SCI-2 modulation symbols may be copied on both layers.

Figure 10:
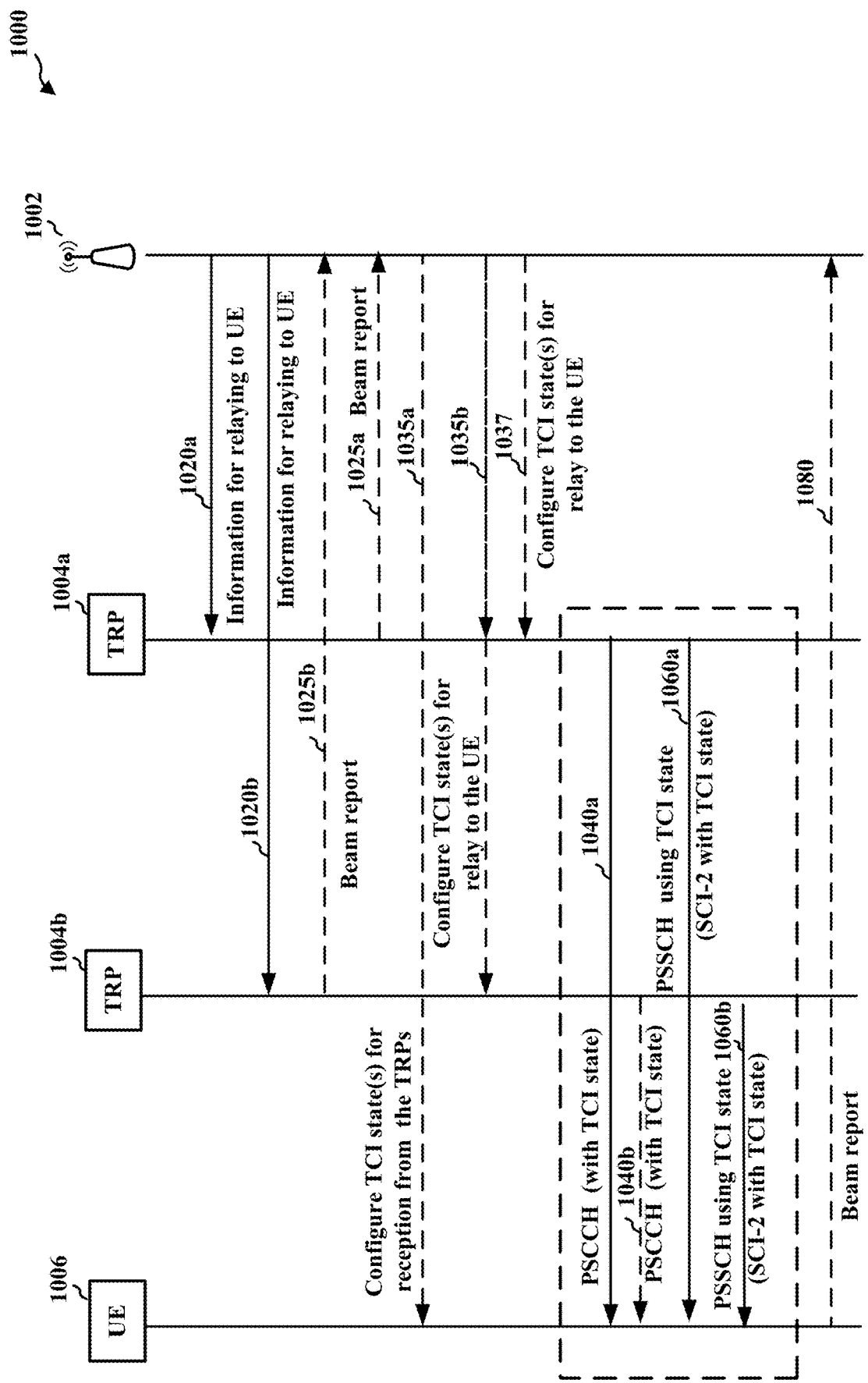
FIG. 10 illustrates an example communication flow between devices communicating based on sidelink communication.

FIG. 10 illustrates an example communication flow 1000 between a target UE 1006, two helping TRPs 1004a and 1004b, and a base station 1002. In some examples, the TRP 1004a and/or 1004b may be a UE. Aspects of the base station 1002 may be implemented by the base station 102/180 of FIG. 1, the base station 602 in FIG. 6, and or the like. Aspects of the two TRPs 1004a and 1004b may be implemented by the TRP 107 of FIG. 1, and/or the UEs 604b and 604c of FIG. 6. Although two TRPs are illustrated in FIG. 10, one TRP or more than two TRPs may be utilized in some aspects.

In the illustrated example of FIG. 10, a communication link between the base station 1002 and the target UE 1006 may be degraded, fail, or be dropped due to an issue, such as blockage or fading. The base station 1002 may determine to attempt to employ one or more of the TRPs 1004a and 1004b (may also be referred as relaying TRPs) to transmit data to the target UE 1006 to the relaying TRPs 1004a and 1004b. The data to be transmitted to the target UE 1006 may then be transmitted by the relaying TRPs 1004a and 1004b via sidelink. To support such communication, sidelink TCI state indication may be signaled.

At 1020a and 1020b, the base station 1002 transmits communication to TRPs 1004a and 1004b for relaying data to the target UE 1006 via a sidelink. In the communication, the base station 1002 may include a configuration of the TCI states of the target UE 1006 and may optionally include a configuration of the Tx beam of the relaying TRPs 1004a and 1004b. In some aspects, the base station 1002 may indicate the TCI state based on a quasi co-location (QCL) relationship to a sidelink synchronization signal block (SSB) or a sidelink channel state information reference signal (CSI-RS). The QCL relationship may be based on QCL relationship identified by a sidelink SSB/CSI-RS based beam search. In some aspects, the communication may not include a configuration of the Tx beam of the relaying TRPs 1004a and 1004b and the relaying TRPs 1004a and 1004b may determine the Tx beams. In some examples, the UE 1006 may report its beam selection for sidelink to the base station 1002.

At 1025a and 1025b, the base station 1002 may receive a beam information report for one or more beams of the relaying TRPs 1004a and 1004b. The base station 1002 may configure a sidelink TCI state for the TRPs 1004a, 1004b, and/or UE 1006 based on the report in 1035a and 1035b. The base station 1002 may receive the beam information report in aspects where configuration of the Tx beam of the relaying UEs is included or not included.

In some aspects, the base station 1002, SCI-1 may be comprised in a PSCCH, and the base station may configure the TCI state for the PSCCH.

For a relaying TRP 1004a or 1004b, the base station 1002 may indicate for the TRP to transmit on particular beams and may request a report about the beams, e.g., indicating which beams were better than the others. The base station may then determine TCI, a spatial relation for sidelink transmission, etc. and may configure the TRPs 1004a and/or 1004b to use the TCI or spatial relation. In other aspects, the TRPs 1004a or 1004b may determine their own transmit beams for sidelink and may provide the base station 1002 with a report, such as including a sidelink beam index for the selected beam(s) or an RSRP for the selected beam(s).

In some aspects, the base station 1002 may configure the TCI state(s) for the target UE 1006. In some examples, the TCI state may be configured or updated for the target UE 1006 in a medium access control-control element (MAC-CE) over a Uu interface or a sidelink interface. The MAC-CE may indicate a relationship between a resource for SCI, such as SCI-1, and a TCI state identifier (ID). The relationship may be indicated in a map, e.g., mapping between each SCI-1 resource and a TCI state ID. In some examples, the base station may delegate selection of the TCI state, e.g., to a master sidelink device, such as a master sidelink UE. The master sidelink device may indicate the TCI state to the UE over sidelink. In some examples, the base station 1002 may delegate the selection to a TRP, e.g., TRP 1004a or 1004b. In some examples, the sidelink receiving UE may update the sidelink transmitting UE's beam. In other examples, the sidelink transmitting UE may update the sidelink receiving UE's beam.

In some aspects, the base station 602 may configure the TCI state for the target UE in first TCI state for the target UE in DCI granting sidelink resources. As noted above, the sidelink communication may be based on Mode 1 in which the base station allocates the resources for the sidelink communication between the TRPs 1004a and 1004b and the target UE 1006. The DCI may be DCI format 3_0 and may be used for granting sidelink resources and configuring TCI state. The DCI may include a TCI ID. In some aspects, the targeted UE 604a may be configured to decode sidelink grant DCI format 3_0.

Figure 11:
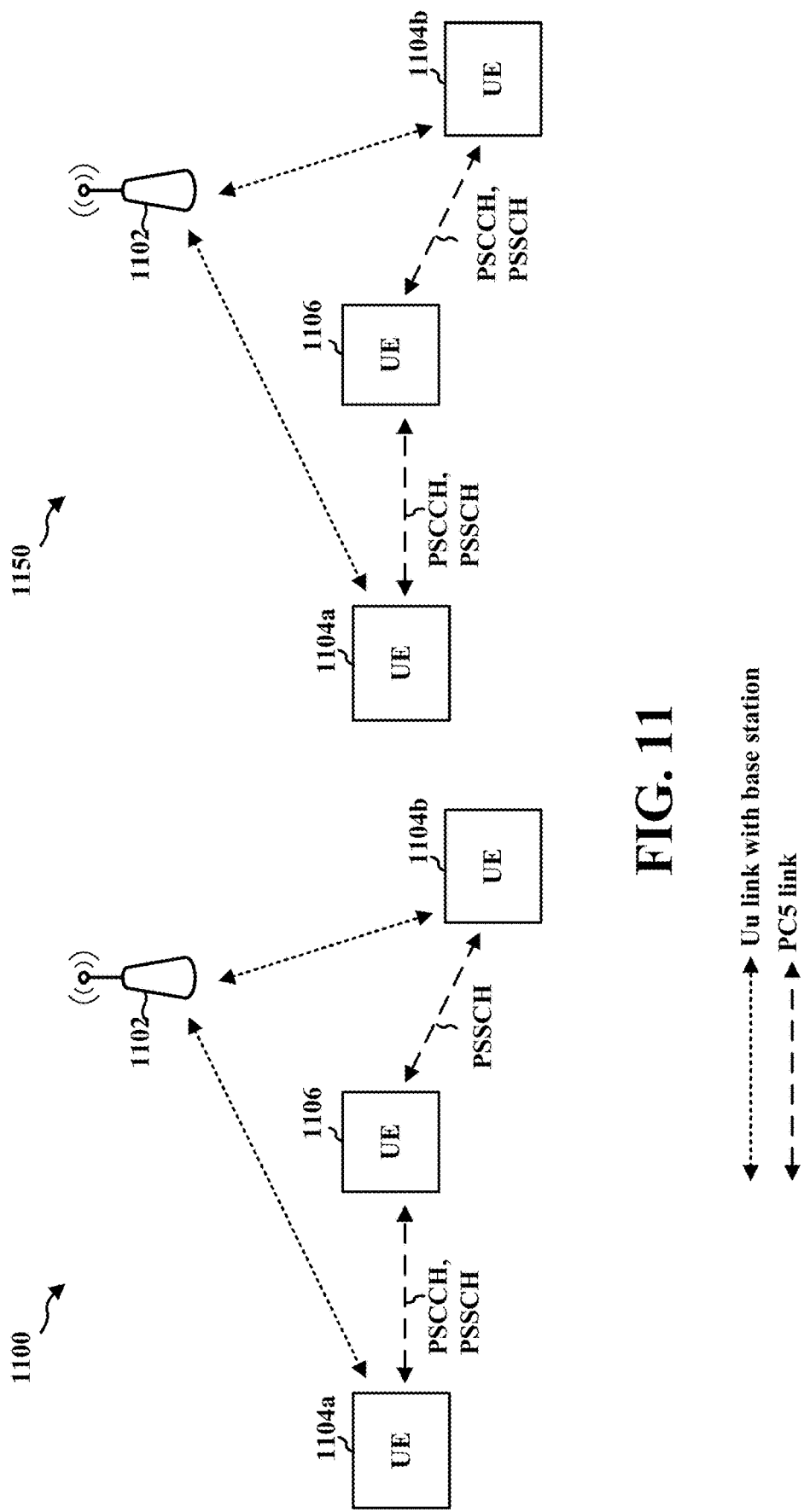
FIG. 11 illustrates example aspects of a wireless communication system including a base station and UEs.

Further at 1035a and 1035b, the base station 1002 may configure a second TCI state for a PSSCH. In some aspects, the second TCI state may be the same TCI state as the first TCI state. In some of such aspects, one of the TRPS 1004a and 1004b may transmit PSCCH 1040a/1040b to the target UE 1006 and that TRP that is transmitting the PSCCH may indicate the TCI state to the target UE 1006. FIG. 11 illustrates an example diagram 1100 in which relay UE 1104a transmits PSCCH and PSSCH to the target UE 1106 and the other relay UE 1104b transmits PSSCH without transmitting PSCCH. The relay UE 1104a and the other relay UE 1104b may be connected to a base station 1102.

In some aspects, the second TCI state may be different from the first TCI state, and may be included in SCI. In some aspects, the second TCI state is included in SCI-1 and SCI-1 may include TCI states for PSCCH for both of the relaying TRPs 1004a and 1004b in FIG. 10 (even though in some such aspects one of the relaying UEs 1004a and 1004b may transmit the PSCCH, such as in FIG. 11). The relaying TRP that is transmitting the PSCCH, such as TRP 1004a, may receive the TCI state information for the other UE 1004b from the base station 1002 in 1037. The TCI states for the PSSCH may be configured based on any of the example aspects described for configuring the TCI states for the PSCCH.

In some aspects, the TRP transmitting the PSCCH may transmit SCI-2 to the target UE 1006 in the PSSCH at 1060a. The SCI-2 may include TCI states for the PSSCH for both of the relaying TRPs 1004a and 1004b. In some aspects, both of the relaying TRPs 1004a and 1004b may transmit the SCI-2 in PSSCH and may include their respective TCI states for data part of their PSSCH in the SCI-2 at 1060a and 1060b. In some aspects, both of the relaying TRPs 1004a and 1004b may transmit the SCI-2 in PSSCH and may include the TCI states for data part of both of the TRP's PSSCH in the SCI-2 at 1060a and 1060b. There may be a gap between the SCI-2 and the PSSCH data, in some examples.

In some aspects both relaying TRPs 1004a and 1004b may transmit the PSCCH to the target UE 1006. FIG. 11 illustrates an example 1150 in which both relaying UE 1104a and relaying UE 1104b transmit PSCCH and PSSCH to the target UE 1106. The second TCI state (e.g., for the PSSCH) may be the same as the first TCI state (e.g., for the PSCCH) for the corresponding TRP or may be indicated by the corresponding TRP in the SCI comprised in the PSCCH.

Figure 12:
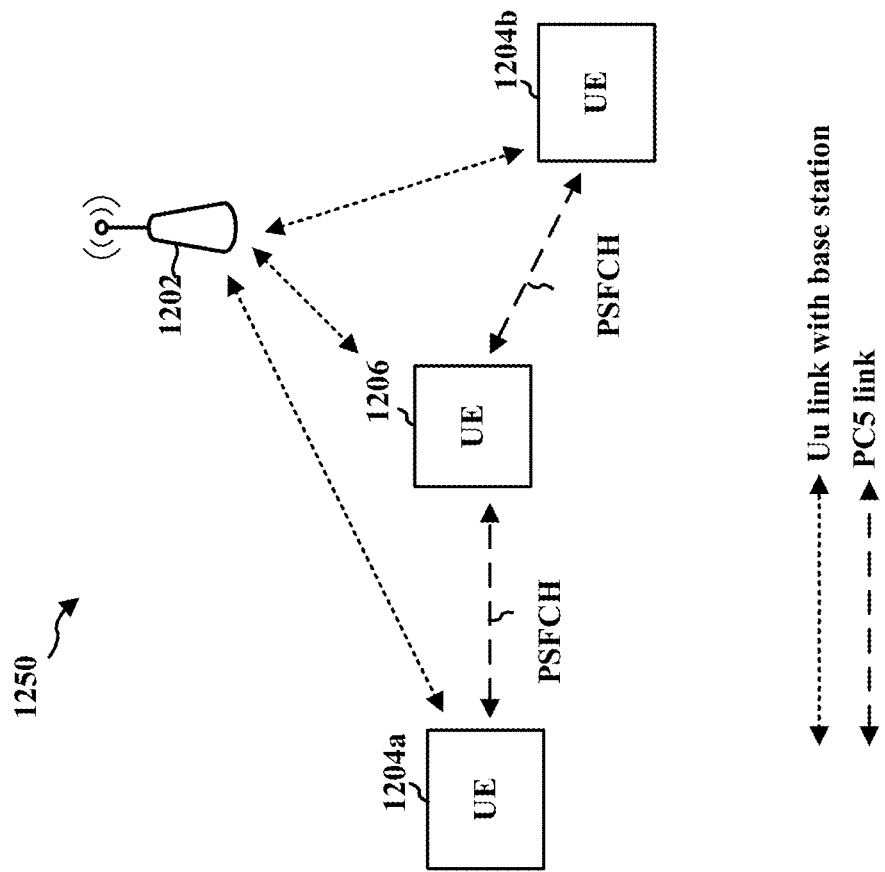
FIG. 12 illustrates example aspects of a wireless communication system including a base station and UEs.

In some aspects, a PSFCH may be configured for the target UE 1006 to provide feedback about the sidelink data transmissions that the UE 1006 receives from the TRPs 1004a and 1004b. FIG. 12 illustrates an example 1250 in which a target UE 1206 uses a PSFCH to provide feedback to a relay UE 1204a and a relay UE 1204b. The relay UE 1204a and the other relay UE 1204b may be connected to a base station 1202. A beam for the PSFCH may be configured for the target UE over a Uu interface, for example. In some aspects, the PSFCH beam may be indicated to the target UE in either SCI-1 or SCI-2 in 1040a/1040b/1060a/1060b. In aspects where the PSFCH is indicated in SCI-1, the SCI-1 may include a PSFCH beam indication for sending feedback to TRP 1004a and another beam for sending feedback to TRP 1004b. The TRP transmitting the PSCCH may receive the PSFCH beam indication for the other relaying UE from the base station 1002 and may provide the information to the target UE 1006 in the SCI-1.

In some aspects where the PSFCH is indicated in SCI-2, an SCI-2 from one TRP may include the PSFCH beam indication for both relaying UEs 1004*a* and 1004*b*. In this example, one of the TRPs may transmit SCI-2 in the PSSCH and the other may not transmit SCI-2 in the PSSCH. In some aspects where the PSFCH is indicated in SCI-2, both of the relaying UEs 1004*a* and 604*b* may transmit the SCI-2 and may include their respective PSFCH beam indications or both of their PSFCH beam indications.

In some examples, both TRPs may transmit PSCCH, e.g., such as illustrated in example 1150. In this example, the PSFCH beam for the respective TRPs may have a spatial relation to the beams used for the respective PSCCH. In another example, each PSCCH may carry SCI that indicates the TCI information for the respective PSFCH.

In 1080, the target UE 1006 may report information regarding one or more beams used to the base station 1002. The information regarding the one or more beams may be used in a subsequent communication.

Figure 13:
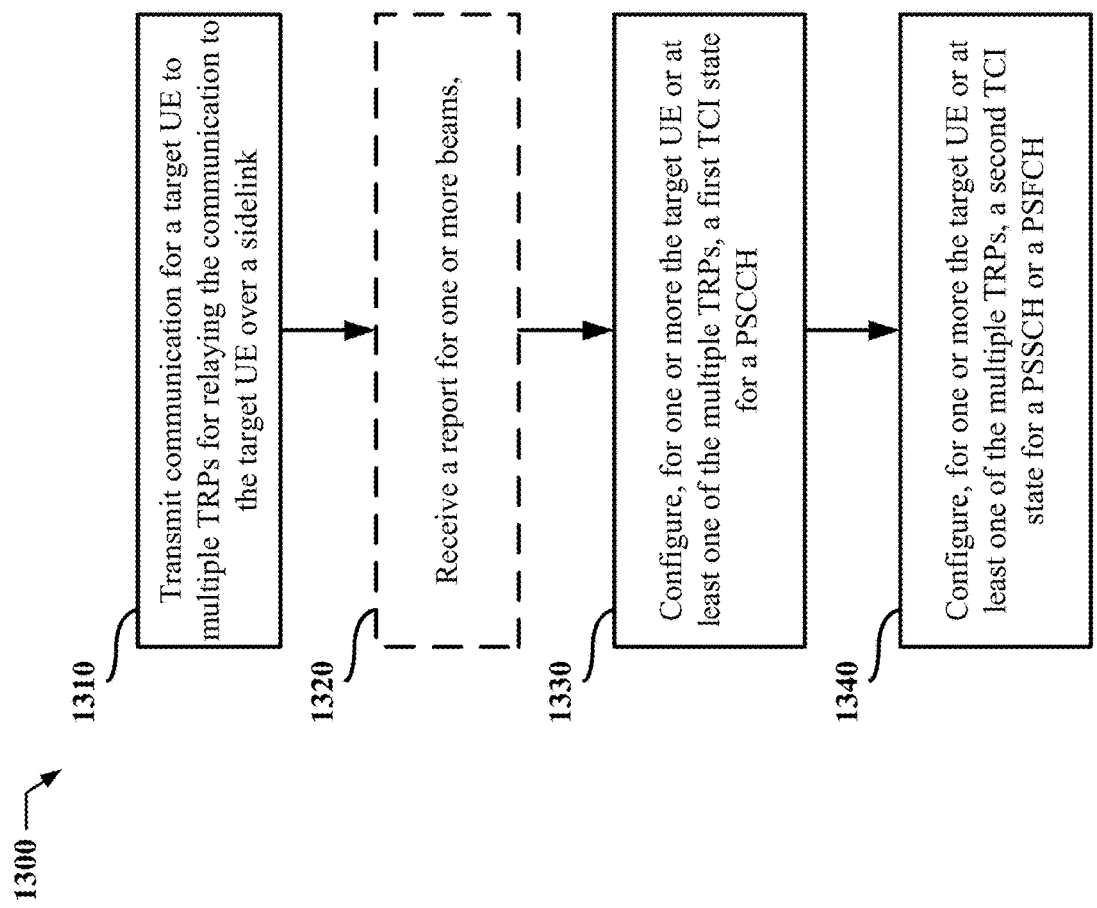
FIG. 13 is a flowchart of a method of wireless communication.

FIG. 13 is a flowchart 1300 of a method of wireless communication. The method may be performed by a base station (e.g., the base station 102/180 of FIG. 1, the base station 602 of FIG. 6, the base station 1002 FIG. 6 which may include the memory 376 and which may be the entire base station (e.g., device 310) or a component of the device 310, such as the TX processor 316, the RX processor 370, and/or the controller/processor 375, the apparatus 1602). Optional aspects are illustrated with a dashed line. The method may support signaling of TCI state for multi-TRP relaying over sidelink.

At 1310, the base station transmits communication for a target UE to multiple TRPs, such as multiple other UEs, for relaying the communication to the target UE over a sidelink. In the communication, the base station may also indicate for the at least for the at least one of the multiple TRPs to transmit on one or more beams. The base station may communicate based on aspects described in connection with any of FIGS. 6-12. In some aspects, 1310 may be performed by the communication component 1640 in FIG. 16.

At 1320, the base station receives a report for the one or more beams. The base station may configure the sidelink TCI state for the at least one of the multiple TRPs based on the report, such as described in connection with FIG. 10. The report may be received from the at least one of the multiple TRPs regarding the one or more beams where the base station indicated. The report may also be received from the at least one of the multiple TRPs regarding one or more beams where the TRP determined to use. In some aspects, 1320 may be performed by the report reception component 1642 in FIG. 16.

At 1330, the base station configures one or more of the target UE or at least one of the multiple TRPs with a first TCI state for a PSCCH. In some aspects, the base station configures the first TCI state for the target UE in a MAC-CE (MAC-CE) over a Uu interface or a sidelink interface. In some aspects, the MAC-CE indicates a relationship between a resource for sidelink control information and a TCI state. In some aspects, the base station configures the target UE to receive the first TCI state from another UE, such as a relaying UE (e.g., one of the multiple TRPs). In some aspects, the base station configures the first TCI state for the target UE in DCI granting sidelink resources. In some aspects, the DCI indicates a TCI state ID for the sidelink resources. In some aspects, the DCI comprises DCI format 3_0. The configuration may be based on any of the aspects described in connection with FIG. 10, for example. In some aspects, 1330 may be performed by the configure component 1644 in FIG. 16.

At 1340, the base station configures one or more of the target UE or at least one of the multiple TRPs, a second TCI state for a PSSCH or a PSFCH. In some aspects, the second TCI state is for the PSSCH and is the same as the first TCI state. In some aspects, the second TCI state is for the PSFCH and is configured for the target UE over a Uu interface. In some aspects, the second TCI state is for indication in sidelink control information. In some aspects, the base station indicates the second TCI state for a first TRP to a second TRP, such as by transmitting a TCI state for UE1 to UE2. The configuration may be based on any of the aspects described in connection with FIG. 10, for example. In some aspects, 1340 may be performed by the configure component 1644 in FIG. 16.

Figure 14:
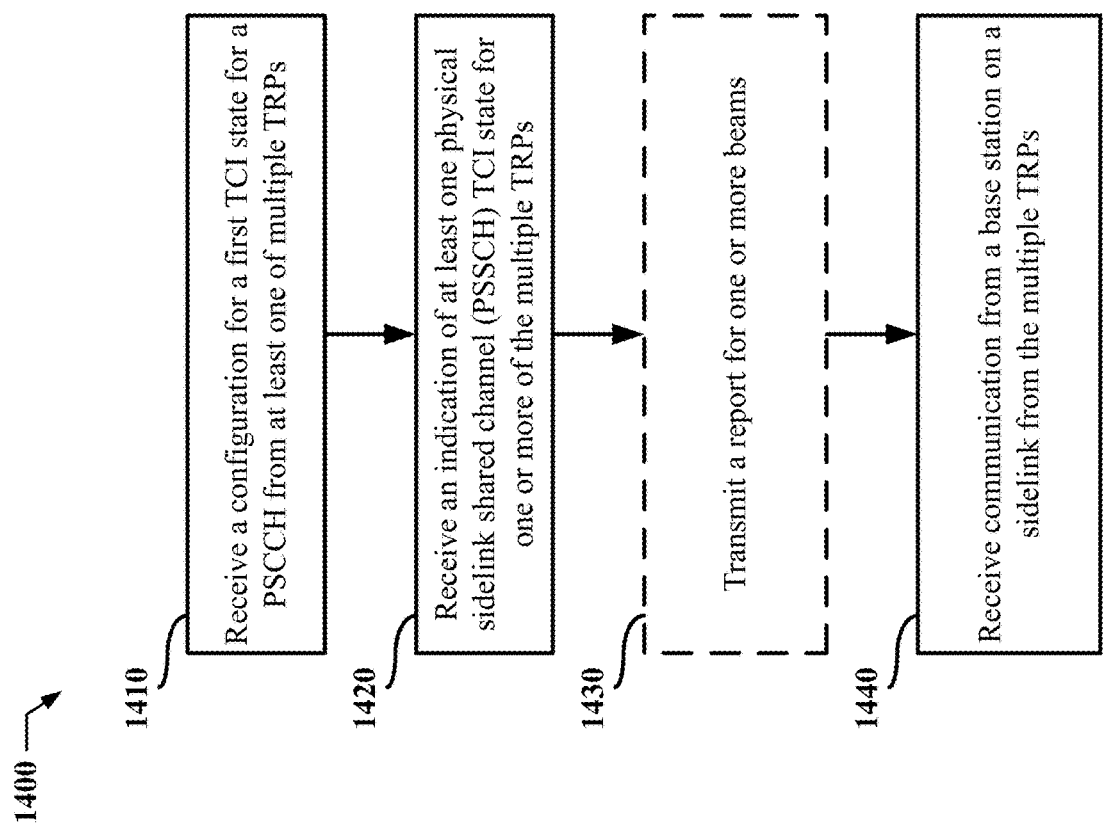
FIG. 14 is a flowchart of a method of wireless communication.

FIG. 14 is a flowchart 1400 of a method of wireless communication. The method may be performed by a UE or a TRP of a UE (e.g., the UE 104 of FIG. 1, the device 350 of FIG. 3, the UEs 604*a* of FIG. 6, and/or the target UE 1006 of FIG. 10, which may include the memory 360 and which may be the entire UE (e.g., the device 350) or a component of the device 350, such as the TX processor 368, the RX processor 356, and/or the controller/processor 359, the apparatus 1702). Optional aspects are illustrated with a dashed line. The method may support signaling of TCI state information for multi-TRP relaying over sidelink.

At 1410, the target UE receives a configuration for a first TCI state for a PSCCH from at least one of multiple TRPs. 1410 may include aspects described in connection with 1040*a*/1040*b* in FIG. 10. The TRPs may be relaying UEs. In some aspects, the first TCI state may be received in a MAC-CE over a Uu interface or a sidelink interface. In some aspects, the MAC-CE indicates a relationship between a resource for sidelink control information and a TCI state ID, such as a mapping. In some aspects, the UE may first receive an indication from the base station to receive the first TCI state from another UE and the first TCI state is received from the other UE. In some aspects, 1410 may be performed by the configuration reception component 1740 in FIG. 17.

In some aspects, the UE receives the configuration of the first TCI state in DCI granting sidelink resources. In some aspects, the DCI indicates a TCI state ID for the sidelink resources. In some aspects, the DCI includes DCI format 3_0 and the target UE may be configured to decode the DCI format 3_0.

At 1420, the target UE may receive an indication of at least one PSSCH TCI state for one or more of the multiple TRPs, which may include aspects described in connection with 1060*a*/1060*b* in FIG. 10. In some aspects, the PSSCH TCI state is the same as a PSCCH TCI state. In some aspects, the PSSCH TCI state is indicated in SCI, such as SCI-1 (PSCCH) or SCI-2 (PSSCH). In some aspects, the UE receives the SCI from a first TRP and the SCI indicates a first PSSCH TCI state for the first TRP and a second PSSCH TCI state for a second TRP. In some aspects, the SCI is received in the PSCCH from the first TRP. In some aspects, the SCI is received in the PSSCH from the first TRP. In some aspects, the UE receives a first SCI from a first TRP indicating a first PSSCH TCI state for the first TRP and receives a second SCI from a second TRP indicating a second PSSCH TCI state for the second TRP. In some aspects, 1420 may be performed by the indication reception component 1742 in FIG. 17.

In some aspects, the UE receives a first SCI from a first TRP indicating a first PSSCH TCI state for the first TRP and a second PSSCH TCI state for a second TRP. The UE may receive a second SCI from a second TRP indicating the first PSSCH TCI state for the first TRP and the second PSSCH TCI state for the second TRP. In some aspects, the UE receives a first PSCCH from a first TRP and receives a second PSCCH from a second TRP. A first PSSCH TCI state applies for the first TRP and a second PSSCH TCI state applies for the second TRP.

In some aspects, the first PSSCH TCI state is the same as a first TCI state for the PSCCH for the first TRP and the second PSSCH TCI state is the same as a second TCI state for the PSCCH for the second TRP. In some aspects, the first PSCCH comprises a first SCI indicating the first PSSCH TCI state for the first TRP and the second PSCCH comprises the second SCI from indicating a second PSSCH TCI state for the second TRP. In some aspects, the UE receives the SCI from a first TRP, and wherein the SCI indicates a first physical sidelink feedback channel (PSFCH) TCI state for the first TRP and a second PSFCH TCI state for a second TRP.

In some aspects, the UE receives a first SCI from a first TRP indicating a first PSFCH TCI state for the first TRP and receives a second SCI from a second TRP indicating a second PSFCH TCI state for the second TRP. In some aspects, the UE receives a first SCI from a first TRP indicating a first PSFCH state for the first TRP and a second PSFCH TCI state for a second TRP and the UE receives a second SCI from a second TRP indicating the first PSFCH TCI state for the first TRP and the second PSFCH TCI state for the second TRP.

In some aspects, the UE receives a first physical sidelink feedback channel (PSFCH) from a first TRP and receives a second PSFCH from a second TRP. A first PSFCH TCI state applies for the first TRP and a second PSFCH TCI state applies for the second TRP. In some aspects, the first PSFCH TCI state is the same as a first TCI state for the PSCCH for the first TRP and the second PSFCH TCI state is the same as a second TCI state for the PSCCH for the second TRP. In some aspects, the first PSCCH comprises a first SCI indicating the first PSFCH TCI state for the first TRP and the second PSCCH comprises the second SCI from indicating a second PSFCH TCI state for the second TRP.

At 1430, the target UE may receive communication including data originated from a base station from the multiple TRPs. The data may be included in the PSSCH from the multiple TRPs, which may include aspects described in connection with 1060a/1060b in FIG. 10. In some aspects, 1430 may be performed by the communication reception component 1744 in FIG. 17.

At 1440, the target UE transmit a report for one or more beams to the base station. The base station may configure TCI states in subsequent communications based on the report. In some aspects, 1440 may be performed by the report transmission component 1746 in FIG. 17.

Figure 15:
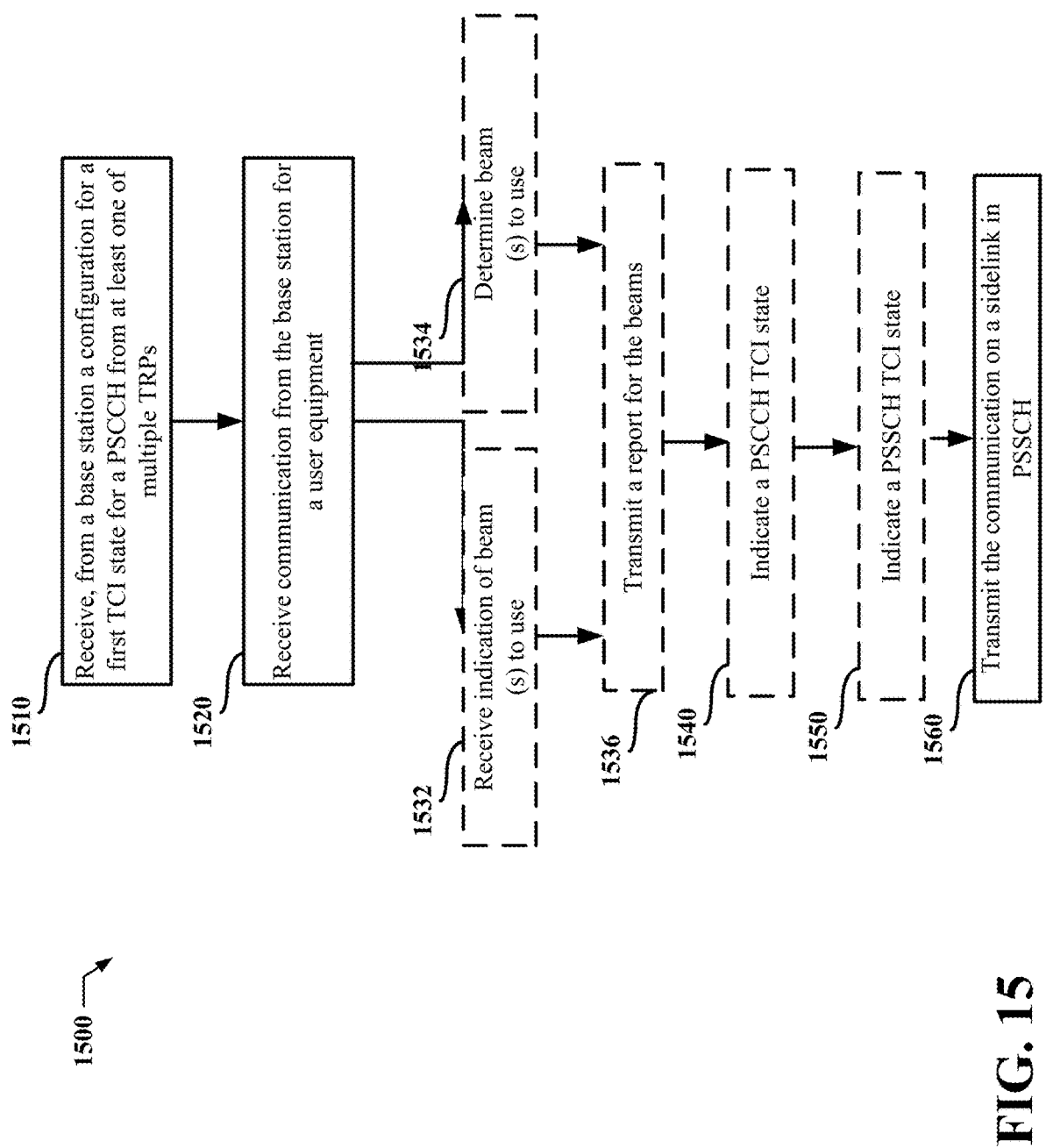
FIG. 15 is a flowchart of a method of wireless communication.

FIG. 15 is a flowchart 1500 of a method of wireless communication. The method may be performed by a first UE or a TRP of a UE (e.g., the UE 104 of FIG. 1, the device 350 of FIG. 3, the UEs 604b and 604c of FIG. 6, and/or the relaying UE 1004a/1004b of FIG. 10, which may include the memory 360 and which may be the entire UE (e.g., the device 350) or a component of the device 350, such as the TX processor 368, the RX processor 356, and/or the controller/processor 359, the apparatus 1802). Optional aspects are illustrated with a dashed line. The method may support signaling of TCI state in sidelink multi TRP relaying.

At 1510, the relaying UE receives, from a base station a configuration for a first TCI state for a PSCCH from TRPs, e.g., which may include aspects described in connection with 1020a/1020b in FIG. 10. In some aspects, the configuration for the first TCI state is received in a MAC-CE over a Uu interface or a sidelink interface. In some aspects, the first TCI state is received in a MAC-CE over a Uu interface or a sidelink interface. In some aspects, the MAC-CE indicates a relationship between a resource for sidelink control information and a TCI state ID, such as a mapping. In some aspects, the UE may first receive an indication from the base station to receive the first TCI state from another UE and the first TCI state is received from the other UE. In some aspects, 1510 may be performed by the configuration reception component 1840 in FIG. 18.

In some aspects, the UE receives the configuration of the first TCI state in DCI granting sidelink resources. In some aspects, the DCI indicates a TCI state ID for the sidelink resources. In some aspects, the DCI includes DCI format 3_0 and the target UE may be configured to decode the DCI format 3_0.

At 1520, the relaying UE receiving communication from the base station for a UE, such as a target UE. 1520 may include aspects described in connection with 1020a/1020b in FIG. 10. In some aspects, 1520 may be performed by the communication reception component 1842 in FIG. 18.

At 1532, the relaying UE receives indication from the base station on one or more beams to transmit on. Alternatively, at 1534, the relaying UE determines one or more beams to transmit on for the sidelink. In some aspects, 1532 or 1534 may be performed by the beam determine component 1844 in FIG. 18.

At 1536, the relaying UE transmit a report for the one or more beams. The configuration of the first TCI state for the at least one of the multiple TRPs may be based on the report, which may include aspects described in connection with 1025a/1025b in FIG. 10. In some aspects, 1536 may be performed by the report component 1846 in FIG. 18.

At 1540, the relaying UE indicates a PSCCH TCI state to the target UE. 1540 may include aspects described in connection with 1040a/1040b in FIG. 10. At 1550, the relaying UE indicates a PSSCH TCI state to the target UE, which may include aspects described in connection with 1060a/1060b in FIG. 10. In some aspects, 1540 and 1550 may be performed by the TCI indication component 1848 in FIG. 18. In some aspects, the PSSCH TCI state is the same as the PSCCH TCI state. In some aspects, the PSSCH TCI state is indicated in SCI, such as SCI-1 (in PSCCH) or SCI-2 (in PSSCH). In some aspects, the SCI indicates a first PSSCH TCI state for a first TRP and a second PSSCH TCI state for a second TRP. In some aspects, the SCI indicates a single PSSCH TCI state for the TRP. In some aspects, the relaying UE further indicates a PSFCH TCI state for at least one of the multiple TRPs, such as for the relaying UE itself and optionally another UE. In some aspects, the PSFCH TCI state is indicated in SCI. In some aspects, the PSFCH TCI state is the same as PSSCH TCI state. In some aspects, the SCI indicates a first PSFCH TCI state for a first TRP and a second PSFCH TCI state for a second TRP.

At 1560, the relaying UE transmit data in the communication originated from the base station to the target UE on a sidelink, such as by including the data in PSSCH, which may include aspects described in connection with 1060a/1060b in FIG. 10. In some aspects, 1560 may be performed by the communication component 1850 in FIG. 18.

Figure 16:
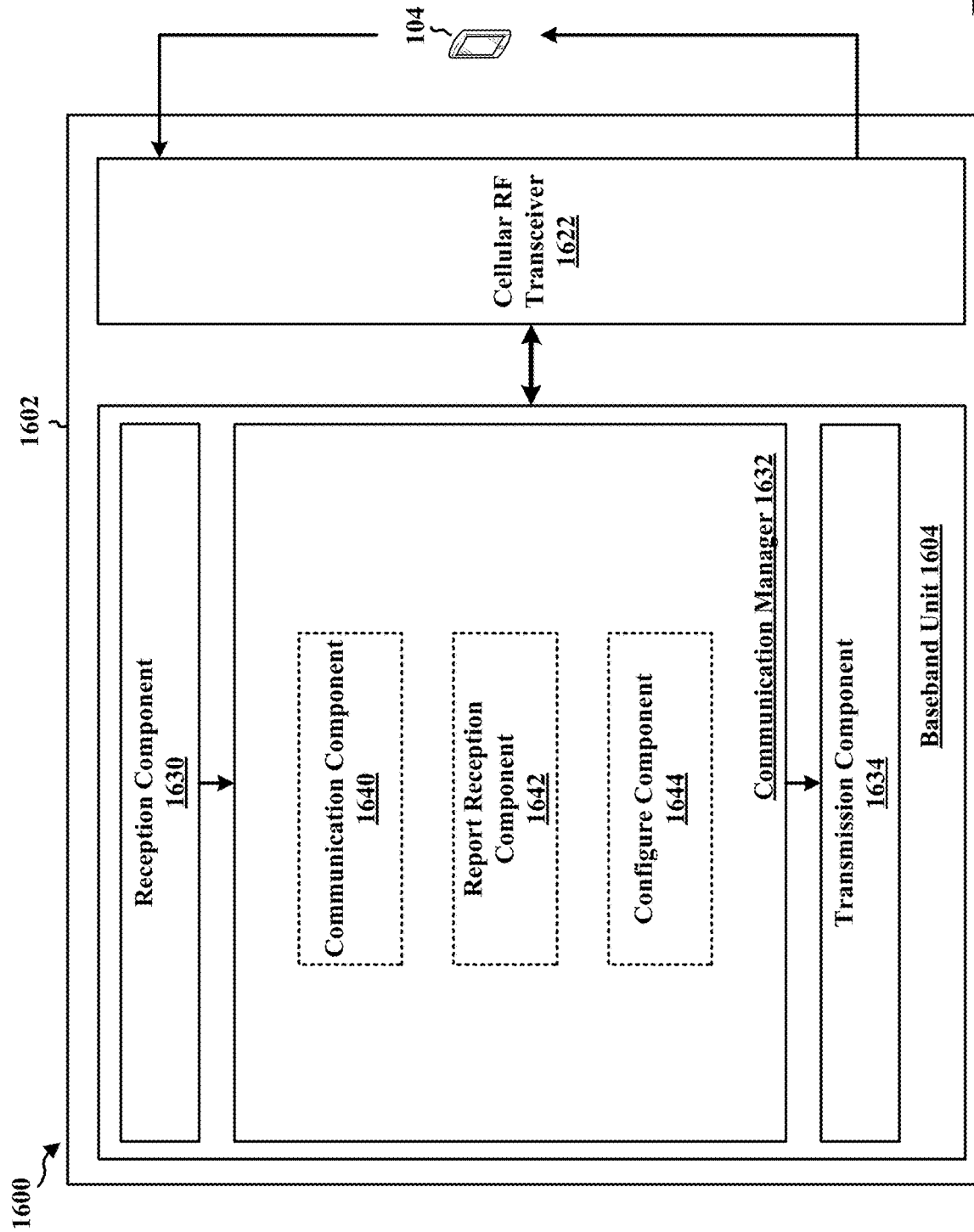
FIG. 16 is a diagram illustrating an example of a hardware implementation for an example apparatus.

FIG. 16 is a diagram 1600 illustrating an example of a hardware implementation for an apparatus 1602. The apparatus 1602 is a BS and includes a baseband unit 1604. The baseband unit 1604 may communicate through a RF transceiver 1622 with the UE 104. In some aspects, the RF transceiver 1622 may be a cellular RF transceiver. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the 310 and may include the memory 376 and/or at least one of the TX processor 316, the RX processor 370, and the controller/processor 375.

The communication manager 1632 includes a communication component 1640 that transmits communication for a target UE to multiple TRPs, such as multiple other UEs, for relaying the communication to the target UE over a sidelink, e.g., as described in connection with 1310 in FIG. 13. The communication manager 1632 further includes a report reception component 1642 that receives a report for the one or more beams, e.g., as described in connection with 1320 in FIG. 13. The communication manager 1632 further includes a configure component 1644 that configures one or more of the target UE or at least one of the multiple TRPs with a first TCI state for a PSCCH, e.g., as described in connection with 1330 in FIG. 13.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for transmitting communication for a target UE to multiple TRPs for relaying the communication to the target UE over a sidelink. The baseband unit 1604 may further include means for configuring, for one or more of the target UE or at least one of the multiple TRPs, a first TCI state for a PSCCH. The baseband unit 1604 may further include means for indicating for the at least one of the multiple TRPs to transmit on one or more beams. The baseband unit 1604 may further include means for receiving a report for the one or more beams, wherein the base station configures the sidelink TCI state for the at least one of the multiple TRPs based on the report. The baseband unit 1604 may further include means for receiving a report of sidelink transmit beams for the at least one of the multiple TRPs. The baseband unit 1604 may further include means for configuring, for one or more of the target UE or the multiple TRPs, a second TCI state for a PSSCH or a PSFCH. The baseband unit 1604 may further include means for indicating the second TCI state for a first TRP to a second TRP.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 17:
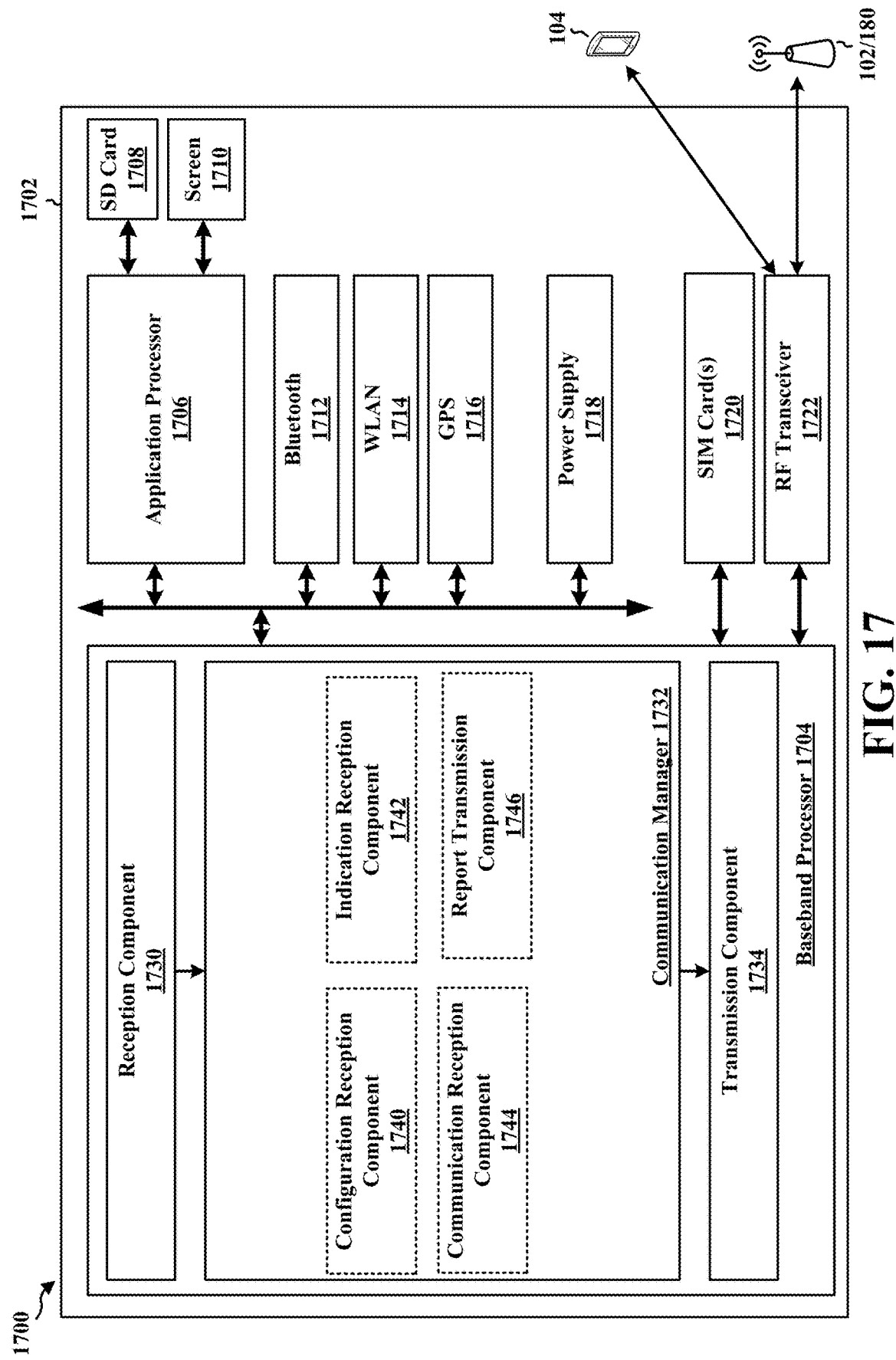
FIG. 17 is a diagram illustrating an example of a hardware implementation for an example apparatus.

FIG. 17 is a diagram 1700 illustrating an example of a hardware implementation for an apparatus 1702. The apparatus 1702 is a UE and includes a baseband processor 1704 (also referred to as a modem) coupled to a RF transceiver 1722. In some aspects, the baseband processor 1704 may be a cellular baseband processor, and the RF transceiver 1722 may be a cellular RF transceiver. The apparatus may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and/or a power supply 1718. The baseband processor 1704 communicates through the RF transceiver 1722 with the UE 104 and/or BS 102/180. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described supra. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the device 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes a configuration reception component 1740 that is configured to receive a configuration for a first TCI state for a PSCCH from at least one of multiple TRPs, e.g., as described in connection with 1410 in FIG. 14. The communication manager 1732 further includes an indication reception component 1742 that is configured to receive an indication of at least one PSSCH TCI state for one or more of the multiple TRPs, e.g., as described in connection with 1420 in FIG. 14. The communication manager 1732 further includes a communication reception component 1744 that is configured to receive a transmission on one or more beams from the at least one of the multiple TRPs on one or more beams, e.g., as described in connection with 1430 in FIG. 14. The communication manager 1732 further includes a report transmission component 1746 that is configured to transmit a report for one or more beams to the base station, e.g., as described in connection with 1440 in FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband processor 1704, includes means for receiving a configuration for a first TCI state for a PSCCH from at least one of multiple TRPs. In some aspects the baseband processor 1704 may further include means for receiving communication from a base station on a sidelink from the multiple TRPs, the communication including the PSCCH from the at least one of the multiple TRPs. In some aspects the baseband processor 1704 may further include means for receiving a transmission on one or more beams from the at least one of the multiple TRPs on one or more beams. In some aspects the baseband processor 1704 may further include transmitting a report for the one or more beams, wherein the configuration of the first TCI state is based on the report.

The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
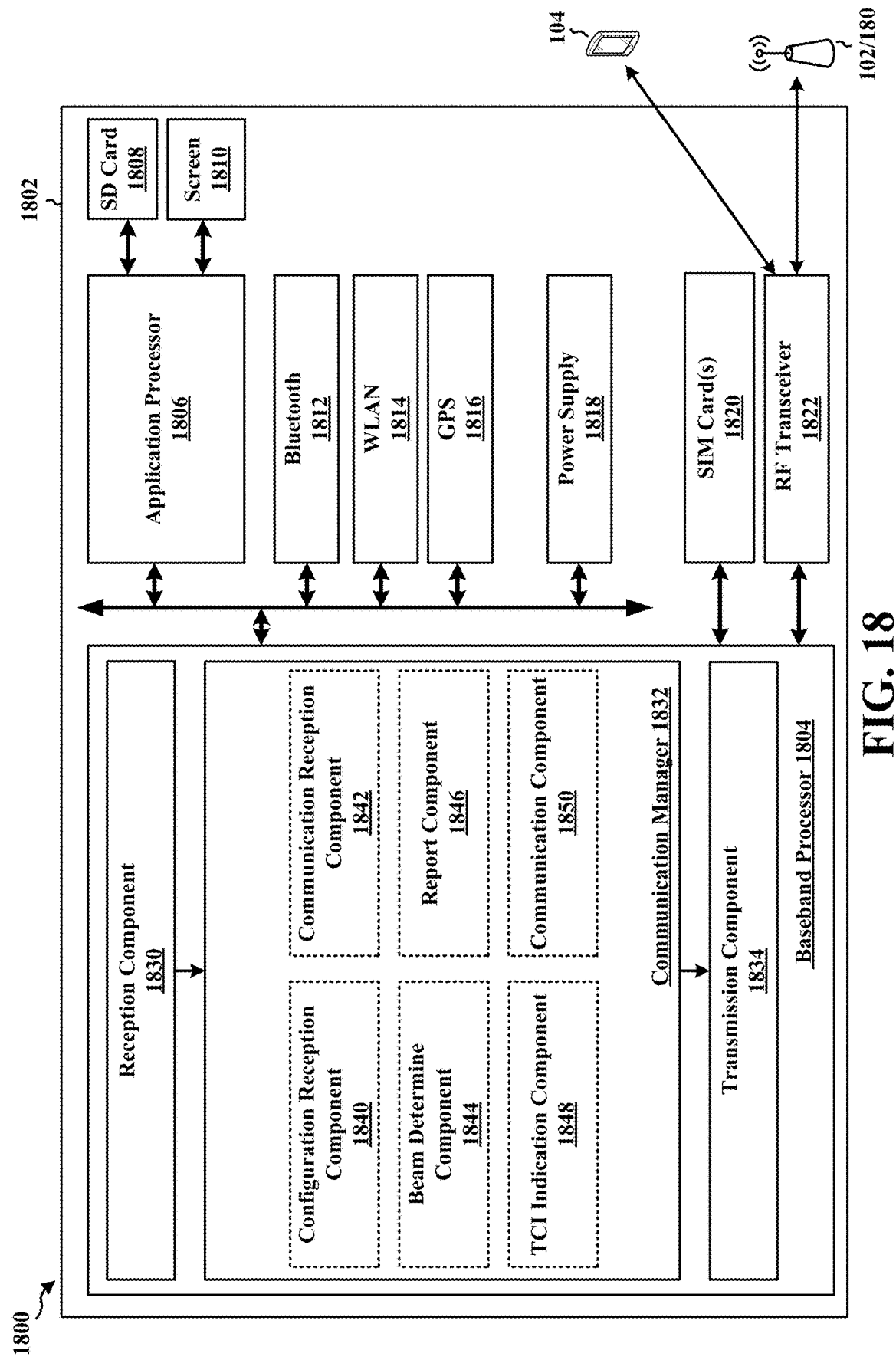
FIG. 18 is a diagram illustrating an example of a hardware implementation for an example apparatus.

FIG. 18 is a diagram 1800 illustrating an example of a hardware implementation for an apparatus 1802. The apparatus 1802 is a UE and includes a baseband processor 1804 (also referred to as a modem) coupled to a RF transceiver 1822. In some aspects, the baseband processor 1704 may be a cellular baseband processor, and the RF transceiver 1722 may be a cellular RF transceiver. The apparatus may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and a power supply 1818. The baseband processor 1804 communicates through the RF transceiver 1822 with the UE 104 and/or BS 102/180. The baseband processor 1804 may include a computer-readable medium/memory. The computer-readable medium/memory may be non-transitory. The baseband processor 1804 is responsible for general processing, including the execution of software stored on the computer-readable medium/memory. The software, when executed by the baseband processor 1804, causes the baseband processor 1804 to perform the various functions described supra. The computer-readable medium/memory may also be used for storing data that is manipulated by the baseband processor 1804 when executing software. The baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband processor 1804. The baseband processor 1804 may be a component of the device 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes a configuration reception component 1840 that is configured to receive, from a base station a configuration for a first TCI state for a PSCCH from at least one of multiple TRPs, e.g., as described in connection with 1510 in FIG. 15. The communication manager 1832 further includes a communication reception component 1842 that is configured to receive communication from the base station for a UE, e.g., as described in connection with 1520 in FIG. 15. The communication manager 1832 further includes a beam determine component 1844 that is configured to receive an indication to transmit on one or more beams or determine a transmit beam for the sidelink, e.g., as described in connection with 1532 and 1543 in FIG. 15. The communication manager 1832 further includes a report component 1846 that is configured to transmit a report for the one or more beams, e.g., as described in connection with 1536 in FIG. 15. The communication manager 1832 further includes a TCI indication component 1848 that is configured to indicate a PSCCH TCI state to the target UE, e.g., as described in connection with 1540 and 1550 in FIG. 15. The communication manager 1832 further includes a communication component 1850 that is configured to transmit data in the communication originated from the base station to the target UE on a sidelink, e.g., as described in connection with 1560 in FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband processor 1804, includes means for receiving communication from a base station for a UE. The baseband processor 1804 may further include means for transmitting the communication to the UE on a sidelink. The baseband processor 1804 may further include means for receiving an indication to transmit on one or more beams. The baseband processor 1804 may further include means for indicating a PSFCH TCI state for at least one of multiple TRPs. The baseband processor 1804 may further include means for receiving, from a base station a configuration for a first TCI state for a PSCCH from at least one of multiple TRPs. The baseband processor 1804 may further include means for receiving communication from the base station for a UE. The baseband processor 1804 may further include means for transmitting the communication to the UE on a sidelink. The baseband processor 1804 may further include means for receiving an indication to transmit on one or more beams. The baseband processor 1804 may further include means for transmitting a report for the one or more beams, wherein the configuration of the first TCI state for the at least one of the multiple TRPs is based on the report. The baseband processor 1804 may further include means for determining a transmit beam for the sidelink. The baseband processor 1804 may further include means for reporting information about the transmit beam for the sidelink to the base station.

The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following aspects are illustrative only and may be combined with other aspects or teachings described herein, without limitation.

Aspect 1 is a method of wireless communication at a base station, comprising:
transmitting communication for a target UE to multiple TRPs for relaying the communication to the target UE over a sidelink; and configuring, for one or more of the target UE or at least one of the multiple TRPs, a first TCI state for a PSCCH between the UE and the at least one of the multiple TRPs.

Aspect 2 is the method of aspect 1, wherein the first TCI state is based on a QCL relationship to a sidelink SSB or a sidelink CSI-RS.

Aspect 3 is the method of aspect 1 or aspect 2, wherein the base station configures the first TCI state for the at least one of the multiple TRPs, the method further comprising: indicating for the at least one of the multiple TRPs to transmit on one or more beams; and receiving a report for the one or more beams, wherein the base station configures the sidelink TCI state for the at least one of the multiple TRPs based on the report.

Aspect 4 is the method of any of aspects 1-3, wherein the base station configures the first TCI state for the at least one of the multiple TRPs, the method further comprising: receiving a report of sidelink transmit beams for the at least one of the multiple TRPs, wherein the base station configures the first TCI state for the at least one of the multiple TRPs based on the report.

Aspect 5 is the method of any of aspects 1-4, wherein the base station configures the first TCI state for the target UE in a MAC-CE over a Uu interface or a sidelink interface.

Aspect 6 is the method of aspect 5, wherein the MAC-CE indicates a relationship between a resource for sidelink control information and a TCI state ID.

Aspect 7 is the method of aspect 5, wherein the base station configures the target UE to receive the first TCI state from another UE.

Aspect 8 is the method of any of aspects 1-7, wherein the base station configures the first TCI state for the target UE in DCI granting sidelink resources.

Aspect 9 is the method of aspect 8, wherein the DCI indicates a TCI state ID for the sidelink resources.

Aspect 10 is the method of aspect 8, wherein the DCI comprises DCI format 3_0.

Aspect 11 is the method of any of aspects 1-10, further comprising: configuring, for one or more of the target UE or the multiple TRPs, a second TCI state for a PSSCH or a PSFCH.

Aspect 12 is the method of aspect 11, wherein the second TCI state is for the PSSCH and is the same as the first TCI state.

Aspect 13 is the method of aspect 11, wherein the second TCI state is for the PSFCH and is configured for the target UE over a Uu interface.

Aspect 14 is the method of aspect 11, wherein the second TCI state is for indication in sidelink control information, the method further comprising: indicating the second TCI state for a first TRP to a second TRP.

Aspect 15 is an apparatus for wireless communication at a base station, comprising: means for transmitting communication for a target UE to multiple TRPs for relaying the communication to the target UE over a sidelink; and means for configuring, for one or more of the target UE or at least one of the multiple TRPs, a first TCI state for a PSCCH.

Aspect 16 is the apparatus of aspect 15 further comprising means to perform the method of any of aspects 2-14.

Aspect 17 is an apparatus for wireless communication at a base station, comprising: memory; and at least one processor coupled to the memory, the memory and at least one processor being configured to perform the method of any of aspects 1-14.

Aspect 18 is a computer-readable medium storing computer executable code for wireless communication at a base station, the code when executed by a processor cause the processor to perform the method of any of aspects 1-14.

Aspect 19 is a method of wireless communication at a UE, comprising: receiving a configuration for a first TCI state for a PSCCH from at least one of multiple TRPs; and receiving communication from a base station on a sidelink from the multiple TRPs, the communication including the PSCCH from the at least one of the multiple TRPs.

Aspect 20 is the method of aspect 19, wherein the first TCI state is based on a QCL relationship to a sidelink SSB or a sidelink CSI-RS.

Aspect 21 is the method of aspect 19 or aspect 20, wherein the base station configures the first TCI state for the at least one of the multiple TRPs, the method further comprising: receiving a transmission on one or more beams from the at least one of the multiple TRPs on one or more beams; and transmitting a report for the one or more beams, wherein the configuration of the first TCI state is based on the report.

Aspect 22 is the method of any of aspects 19-21, wherein the first TCI state is received in a MAC-CE over a Uu interface or a sidelink interface.

Aspect 23 is the method of aspect 22, wherein the MAC-CE indicates a relationship between a resource for sidelink control information and a TCI state ID.

Aspect 24 is the method of aspect 22, wherein the UE receives an indication from the base station to receive the first TCI state from another UE, and wherein the first TCI state is received from the other UE.

Aspect 25 is the method of any of aspects 19-24, wherein the UE receives the configuration of the first TCI state in DCI granting sidelink resources.

Aspect 26 is the method of aspect 25, wherein the DCI indicates a TCI state ID for the sidelink resources.

Aspect 27 is the method of aspect 25, wherein the DCI comprises DCI format 3_0.

Aspect 28 is the method of any of aspects 19-28, further comprising: receiving an indication of at least one PSSCH TCI state for one or more of the multiple TRPs.

Aspect 29 is the method of aspect 28, wherein the at least one PSSCH TCI state is the same as the first TCI state.

Aspect 30 is the method of aspect 29, wherein the indication of the at least one PSSCH TCI state is received in SCI.

Aspect 31 is the method of aspect 30, wherein the UE receives the SCI from a first TRP, and wherein the SCI indicates a first PSSCH TCI state for the first TRP and a second PSSCH TCI state for a second TRP.

Aspect 32 is the method of aspect 31, wherein the SCI is received in the PSCCH from the first TRP.

Aspect 33 is the method of aspect 31, wherein the SCI is received in the PSSCH from the first TRP.

Aspect 34 is the method of aspect 30, wherein the UE receives a first SCI from a first TRP indicating a first PSSCH TCI state for the first TRP and receives a second SCI from a second TRP indicating a second PSSCH TCI state for the second TRP.

Aspect 35 is the method of aspect 30, wherein the UE receives a first SCI from a first TRP indicating a first PSSCH TCI state for the first TRP and a second PSSCH TCI state for a second TRP, and wherein the UE receives a second SCI from the second TRP indicating the first PSSCH TCI state for the first TRP and the second PSSCH TCI state for the second TRP.

Aspect 36 is the method of any of aspects 19-35, wherein the UE receives a first PSCCH from a first TRP and receives a second PSCCH from a second TRP, and wherein a first PSSCH TCI state applies for the first TRP and a second PSSCH TCI state applies for the second TRP.

Aspect 37 is the method of aspect 36, wherein the first PSSCH TCI state is the same as a first TCI state for the PSCCH for the first TRP and the second PSSCH TCI state is the same as a second TCI state for the PSCCH for the second TRP.

Aspect 38 is the method any of aspects 19-37, wherein the first PSCCH comprises a first SCI indicating the first PSSCH TCI state for the first TRP and the second PSCCH comprises the second SCI from indicating a second PSSCH TCI state for the second TRP.

Aspect 39 is the method of any of aspects 19-38, wherein the UE receives the SCI from a first TRP, and wherein the SCI indicates a first PSFCH TCI state for the first TRP and a second PSFCH TCI state for a second TRP.

Aspect 40 is the method of aspect 39, wherein the SCI is received in the PSCCH from the first TRP.

Aspect 41 is the method of aspect 39, wherein the SCI is received in the PSSCH from the first TRP.

Aspect 42 is the method of any of aspects 19-41, wherein the UE receives a first SCI from a first TRP indicating a first PSFCH TCI state for the first TRP and receives a second SCI from a second TRP indicating a second PSFCH TCI state for the second TRP.

Aspect 43 is the method of any of aspects 19-42, wherein the UE receives a first SCI from a first TRP indicating a first PSFCH TCI state for the first TRP and a second PSFCH TCI state for a second TRP, and wherein the UE receives a second SCI from a second TRP indicating the first PSFCH TCI state for the first TRP and the second PSFCH TCI state for the second TRP.

Aspect 44 is the method of any of aspects 19-43, wherein the UE receives a first PSFCH from a first TRP and receives a second PSFCH from a second TRP, and wherein a first PSFCH TCI state applies for the first TRP and a second PSFCH TCI state applies for the second TRP.

Aspect 45 is the method of aspect 44, wherein the first PSFCH TCI state is the same as a first TCI state for the PSCCH for the first TRP and the second PSFCH TCI state is the same as a second TCI state for the PSCCH for the second TRP.

Aspect 46 is the method of aspect 44, wherein the first PSCCH comprises a first SCI indicating the first PSFCH TCI state for the first TRP and a second PSCCH comprises the second SCI from indicating a second PSFCH TCI state for the second TRP.

Aspect 47 is an apparatus for wireless communication at a UE, comprising: means for receiving a configuration for a first TCI state for a PSCCH from at least one of multiple TRPs; and means for receiving communication from a base station on a sidelink from the multiple TRPs, the communication including the PSCCH from the at least one of the multiple TRPs.

Aspect 48 is the apparatus of aspect 47, further comprising means to perform the method of any of aspects 20-46.

Aspect 49 is an apparatus for wireless communication at a UE, comprising: a memory; and at least one processor coupled to the memory, the memory and at least one processor being configured to perform the method of any of aspects 19-46.

Aspect 50 is a computer-readable medium storing computer executable code for wireless communication at a UE, the code when executed by a processor cause the processor to perform the method of any of aspects 19-46.

Aspect 51 is a method of wireless communication at a TRP, comprising: receiving, from a base station a configuration for a first TCI state for a PSCCH from at least one of multiple TRPs; receiving communication from the base station for a UE; and transmitting the communication to the UE on a sidelink.

Aspect 52 is the method of aspect 51, wherein the first TCI state is based on a QCL relationship to a sidelink SSB or a sidelink CSI-RS.

Aspect 53 is the method of aspect 51 or aspect 52, further comprising: receiving an indication to transmit on one or more beams; and transmitting a report for the one or more beams, wherein the configuration of the first TCI state for the at least one of the multiple TRPs is based on the report.

Aspect 54 is the method of any of aspects 51-53, further comprising: determining a transmit beam for the sidelink; and reporting information about the transmit beam for the sidelink to the base station, wherein the configuration of the first TCI state for the at least one of the multiple TRPs is based on the information.

Aspect 55 is the method of any of aspects 51-54, wherein the configuration for the first TCI state is received in a MAC-CE over a Uu interface or a sidelink interface.

Aspect 56 is the method of aspect 55, wherein the MAC-CE indicates a relationship between a resource for sidelink control information and a TCI state ID.

Aspect 57 is the method of any of aspects 51-56, wherein the base station configures the first TCI state for the UE in DCI granting sidelink resources.

Aspect 58 is the method of aspect 57, wherein the DCI indicates a TCI state ID for the sidelink resources.

Aspect 59 is the method of aspect 57, wherein the DCI comprises DCI format 3_0.

Aspect 60 is an apparatus for wireless communication at a TRP, comprising: means for receiving, from a base station a configuration for a first TCI state for a PSCCH from at least one of multiple TRPs; means for receiving communication from the base station for a UE; and means for transmitting the communication to the UE on a sidelink.

Aspect 61 is the apparatus of aspect 60 further comprising means to perform the method of any of aspects 51-59.

Aspect 62 is an apparatus for wireless communication at a TRP, comprising: memory; and at least one processor coupled to the memory, the memory and at least one processor being configured to perform the method of any of aspects 50-59.

Aspect 63 is a computer-readable medium storing computer executable code for wireless communication at a TRP, the code when executed by a processor cause the processor to perform the method of any of aspects 51-59.

Aspect 64 is a method of wireless communication at a TRP, comprising: receiving communication from a base station for a UE; transmitting the communication to the UE on a sidelink; and indicating a PSSCH TCI state for at least one of multiple TRPs.

Aspect 65 is the method of aspect 64, wherein the PSSCH TCI state is the same as a PSCCH TCI state.

Aspect 66 is the method of aspect 64 or aspect 65, wherein the PSSCH TCI state is indicated in SCI.

Aspect 67 is the method of aspect 66, wherein the SCI indicates a first PSSCH TCI state for a first TRP and a second PSSCH TCI state for a second TRP.

Aspect 68 is the method of aspect 67, wherein the SCI is transmitted in a PSCCH from the TRP.

Aspect 69 is the method of aspect 67, wherein the SCI is transmitted in the PSSCH from the TRP.

Aspect 70 is the method of aspect 67, wherein the SCI indicates a single PSSCH TCI state for the TRP.

Aspect 71 is the method of any of aspects 64-70, further comprising: indicating a PSFCH TCI state for at least one of multiple TRPs.

Aspect 72 is the method of aspect 71, wherein the PSFCH TCI state is the same as a PSCCH TCI state.

Aspect 73 is the method of aspect 72, wherein the PSFCH TCI state is indicated in SCI.

Aspect 74 is the method of aspect 73, wherein the SCI indicates a first PSFCH TCI state for a first TRP and a second PSFCH TCI state for a second TRP.

Aspect 75 is the method of aspect 74, wherein the SCI is transmitted in the PSCCH from the TRP.

Aspect 76 is the method of aspect 74, wherein the SCI is transmitted in the PSSCH from the TRP.

Aspect 77 is the method of aspect 74, wherein the SCI indicating a single PSFCH TCI state for the TRP.

Aspect 78 is an apparatus for wireless communication at a TRP, comprising: means for receiving communication from the base station for a UE; means for transmitting the communication to the UE on a sidelink; and means for indicating a PSSCH TCI state for at least one of multiple TRPs.

Aspect 79 is the apparatus of aspect 78, further comprising means to perform the method of any of aspects 65-77.

Aspect 80 is an apparatus for wireless communication at a TRP, comprising: memory; and at least one processor coupled to the memory, the memory and at least one processor being configured to perform the method of any of aspects 64-77.

Aspect 81 is a computer-readable medium storing computer executable code for wireless communication at a TRP, the code when executed by a processor cause the processor to perform the method of any of aspects 64-77.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   transmitting communication to multiple transmission reception points (TRPs), the communication associated with a target user equipment (UE) and communicated via relay to the target UE over sidelink between the multiple TRPs and the target UE; and
   configuring, for one or more of the target UE or at least one TRP of the multiple TRPs, at least a first transmission configuration indicator (TCI) state and a second TCI state for a physical sidelink control channel (PSCCH) between the target UE and the at least one TRP of the multiple TRPs, the first TCI state associated with first communication between the target UE and a first TRP of the multiple TRPs, and the second TCI state associated with second communication between the target UE and a second TRP of the multiple TRPs.

2. The method of claim 1, wherein the first TCI state is based on a quasi co-location (QCL) relationship to a sidelink synchronization signal block (SSB) or a sidelink channel state information reference signal (CSI-RS).

3. The method of claim 1, further comprising:
   indicating for the first TRP to transmit on one or more beams; and
   receiving a first report for the one or more beams, wherein the base station configures the first TCI state for the first TRP based on the first report.

4. The method of claim 3, further comprising:
   receiving a second report of sidelink transmit beams for the first TRP, wherein the base station configures the first TCI state for the first TRP based on the second report.

5. The method of claim 4, wherein the base station configures the first TCI state for the target UE in a medium access control-control element (MAC-CE) over a Uu interface or a sidelink interface or downlink control information (DCI) granting sidelink resources.

6. The method of claim 5, wherein the MAC-CE indicates a relationship between a resource for sidelink control information and a TCI state identifier (ID).

7. The method of claim 5, wherein the base station configures the target UE to receive the first TCI state from another UE.

8. The method of claim 1, further comprising:
configuring, for one or more of the target UE or the multiple TRPs, a third TCI state for a physical sidelink shared channel (PSSCH) or a physical sidelink feedback channel (PSFCH) between the target UE and the at least one TRP of the multiple TRPs.

9. The method of claim 8, wherein the third TCI state is for the PSSCH or the PSFCH.

10. The method of claim 8, wherein the third TCI state is for indication in sidelink control information, the method further comprising:
indicating the third TCI state to the first TRP, the third TCI state associated with the PSSCH or the PSFCH between the target UE and the second TRP.

11. An apparatus for wireless communication at a base station, comprising:
memory; and
at least one processor coupled to the memory, the at least one processor being configured to cause the base station to:
transmit communication to multiple transmission reception points (TRPs), the communication associated with a target user equipment (UE) and communicated via relay to the target UE over sidelink between the multiple TRPs and the target UE; and
configure, for one or more of the target UE or at least one TRP of the multiple TRPs, at least a first transmission configuration indicator (TCI) state and a second TCI state for a physical sidelink control channel (PSCCH) between the target UE and the at least one TRP of the multiple TRPs, the first TCI state associated with first communication between the target UE and a first TRP of the multiple TRPs, and the second TCI state associated with second communication between the target UE and a second TRP of the multiple TRPs.

12. The apparatus of claim 11, wherein the first TCI state is based on a quasi co-location (QCL) relationship to a sidelink synchronization signal block (SSB) or a sidelink channel state information reference signal (CSI-RS).

13. The apparatus of claim 11, wherein the at least one processor is further configured to cause the base station to:
indicate for the first TRP to transmit on one or more beams; and
receive a first report for the one or more beams, wherein the base station configures the first TCI state for the first TRP based on the first report.

14. The apparatus of claim 13, wherein the at least one processor is further configured to cause the base station to:
receive a second report of sidelink transmit beams for the first TRP, wherein the base station configures the first TCI state for the first TRP based on the second report.

15. The apparatus of claim 14, wherein the base station configures the first TCI state for the target UE in a medium access control-control element (MAC-CE) over a Uu interface or a sidelink interface or downlink control information (DCI) granting sidelink resources.

* * * * *